US012478352B2

(12) United States Patent
Trzasko et al.

(10) Patent No.: US 12,478,352 B2
(45) Date of Patent: Nov. 25, 2025

(54) SYSTEMS AND METHODS FOR REMOVING NOISE-INDUCED BIAS IN ULTRASOUND BLOOD FLOW IMAGING

(71) Applicant: Mayo Foundation for Medical Education and Research, Rochester, MN (US)

(72) Inventors: Joshua D. Trzasko, Rochester, MN (US); Shigao Chen, Rochester, MN (US); Chengwu Huang, Rochester, MN (US); Pengfei Song, Champaign, IL (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 637 days.

(21) Appl. No.: 17/260,793

(22) PCT Filed: Jul. 19, 2019

(86) PCT No.: PCT/US2019/042594
§ 371 (c)(1),
(2) Date: Jan. 15, 2021

(87) PCT Pub. No.: WO2020/018901
PCT Pub. Date: Jan. 23, 2020

(65) Prior Publication Data
US 2021/0267577 A1    Sep. 2, 2021

Related U.S. Application Data

(60) Provisional application No. 62/700,424, filed on Jul. 19, 2018.

(51) Int. Cl.
*A61B 8/00* (2006.01)
*A61B 8/06* (2006.01)

(52) U.S. Cl.
CPC .............. *A61B 8/5269* (2013.01); *A61B 8/06* (2013.01); *A61B 8/488* (2013.01); *A61B 8/5207* (2013.01)

(58) Field of Classification Search
CPC ......... A61B 8/06; A61B 8/5269; A61B 8/488; A61B 8/5207
See application file for complete search history.

(56) References Cited

U.S. PATENT DOCUMENTS 8,500,647 B1    8/2013   Kaplan
2015/0141832 A1  5/2015   Yu
(Continued)

FOREIGN PATENT DOCUMENTS

WO    2017146886 A1    8/2017
WO    2017216578 A1    12/2017

OTHER PUBLICATIONS

Song P, Manduca A, Trzasko JD, Chen S. Ultrasound Small Vessel Imaging With Block-Wise Adaptive Local Clutter Filtering. IEEE Trans Med Imaging. Jan. 2017;36(1):251-262. doi: 10.1109/TMI.2016.2605819. Epub Sep. 2, 2016. PMID: 27608455 (Year: 2017).*
(Continued)

*Primary Examiner* — John D Li
(74) *Attorney, Agent, or Firm* — Quarles & Brady LLP

(57) ABSTRACT

Systems and methods for removing the bias induced by noise from power Doppler images to achieve improvements of microvessel image contrast are provided. In one example, the noise-induced bias can be suppressed by utilizing the characteristics of uncorrelated noise in the ultrasound image from data acquired or compounded at different transmitting angles. In another example, the noise-induced bias can be suppressed due to the lack of correlation between adjacent ultrasound images. These example implementations may also be combined, as will be described below.

30 Claims, 20 Drawing Sheets

(56) References Cited

U.S. PATENT DOCUMENTS

| | | | |
|---|---|---|---|
| 2018/0220997 A1 | 8/2018 | Song | |
| 2019/0053780 A1 | 2/2019 | Song | |
| 2019/0196013 A1* | 6/2019 | Stanziola | A61B 8/06 |
| 2019/0261948 A1 | 8/2019 | Gong | |
| 2019/0365354 A1* | 12/2019 | Du | A61B 8/5284 |

OTHER PUBLICATIONS

Baranger, J. et al. "Adaptive spatiotemporal SVD clutter filtering for Ultrafast Doppler Imaging using similarity of spatial singular vectors," IEEE Transactions on Medical Imaging, Feb. 2018.

Bar-Zion, A. et al. "Fast Vascular Ultrasound Imaging With Enhanced Spatial Resolution and Background Rejection," IEEE Transactions on Medical Imaging, Article vol. 36, No. 1, pp. 169-180, Jan. 2017.

Bercoff, J. et al., "Ultrafast Compound Doppler Imaging: Providing Full Blood Flow Characterization," IEEE Transactions on Ultrasonics Ferroelectrics and Frequency Control, Article vol. 58, No. 1, pp. 134-147, Jan. 2011.

Demene, C. et al., "Spatiotemporal Clutter Filtering of Ultrafast Ultrasound Data Highly Increases Doppler and Ultrasound Sensitivity," IEEE Transactions on Medical Imaging, Article vol. 34, No. 11, pp. 2271-2285, Nov. 2015.

Errico, C. et al. "Transcranial functional ultrasound imaging of the brain using microbubble-enhanced ultrasensitive Doppler," Neuroimage, Article vol. 124, pp. 752-761, Jan. 2016.

Errico, C. et al., "Ultrafast ultrasound localization microscopy for deep super-resolution vascular imaging," Nature, Article vol. 527, No. 7579, pp. 499-+, Nov. 2015.

Gronningsaeter, A., et al. "Vessel wall detection and blood noise reduction in intravascular ultrasound imaging." IEEE transactions on ultrasonics, ferroelectrics, and frequency control 43.3 (1996): 359-369.

International Searching Authority. International Search Report and Written Opinion for application PCT/US2019/042594. Mailed on Nov. 27, 2019. 15 pages.

Leow, C. H., et al. "Multi-frame rate plane wave contrast-enhance ultrasound imaging for tumour vasculature imaging and perfusion quantification." 2017 IEEE International Ultrasonics Symposium (IUS). IEEE, 2017.

Li Y.L. et al. "Coherent Flow Power Doppler (CFPD): Flow Detection Using Spatial Coherence Beamforming," Ieee Transactions on Ultrasonics Ferroelectrics and Frequency Control, Article vol. 62, No. 6, pp. 1022-1035, Jun. 2015.

Li, W., et al. "Temporal correlation of blood scattering signals in vivo from radiofrequency intravascular ultrasound." Ultrasound in medicine & biology 22.5 (1996): 583-590.

Mace, E., et al. "Functional ultrasound imaging of the brain," Nature Methods, Article vol. 8, No. 8, pp. 662-U85, Aug. 2011.

Mace, E., et al. "Functional ultrasound imaging of the brain: theory and basic principles." IEEE transactions on ultrasonics, ferroelectrics, and frequency control 60.3 (2013): 492-506.

Mace, E., et al. "High sensitivity brain angiography using Ultrafast Doppler." 2010 IEEE International Ultrasonics Symposium. IEEE, 2010.

Osmanski, B.F. et al. "Functional ultrasound imaging of intrinsic connectivity in the living rat brain with high spatiotemporal resolution," Nature Communications, Article vol. 5, p. 14, Oct. 2014, Art. No. 5023.

Saris, Aecm, et al. "A comparison between compounding techniques using large beam-steered plane wave imaging for blood vector velocity imaging in a carotid artery model." IEEE transactions on ultrasonics, ferroelectrics, and frequency control 63.11 (2016): 1758-1771.

Song P.F. et al., "Accelerated Singular Value-Based Ultrasound Blood Flow Clutter Filtering With Randomized Singular Value Decomposition and Randomized Spatial Downsampling," IEEE Transactions on Ultrasonics Ferroelectrics and Frequency Control, Article vol. 64, No. 4, pp. 706-716, Apr. 2017.

Song P.F. et al., "Improved Super-Resolution Ultrasound Microvessel Imaging With Spatiotemporal Nonlocal Means Filtering and Bipartite Graph-Based Microbubble Tracking," IEEE Transactions on Ultrasonics Ferroelectrics and Frequency Control, Article vol. 65, No. 2, pp. 149-167, Feb. 2018.

Song P.F. et al., "Noise Equalization for Ultrafast Plane Wave Microvessel Imaging," IEEE Transactions on Ultrasonics Ferroelectrics and Frequency Control, Article vol. 64, No. 11, pp. 1776-1781, Nov. 2017.

Song P.F. et al., "Ultrasound Small Vessel Imaging with Block-Wise Adaptive Local Clutter Filtering," IEEE Transactions on Medical Imaging, vol. 36, pp. 251-262, 2017.

Stanziola, A. et al. "ASAP: Super-Contrast Vasculature Imaging using Coherence Analysis and High Frame-Rate Contrast Enhanced Ultrasound," IEEE Transactions on Medical Imaging vol. 37, No. 8, pp. 1847-1856, Feb. 2018.

Tanter M. et al. "Ultrafast Imaging in Biomedical Ultrasound," IEEE Transactions on Ultrasonics Ferroelectrics and Frequency Control, Article vol. 61, No. 1, pp. 102-119, Jan. 2014.

Tremblay-Darveau, C. et al., "Improved Contrast-Enhanced Power Doppler Using a Coherence-Based Estimator," IEEE Transactions on Medical Imaging, Article vol. 36, No. 9, pp. 1901-1911, Sep. 2017.

Urban, A. et al. "Real-time imaging of brain activity in freely moving rats using functional ultrasound," Nature Methods, Article vol. 12, No. 9, pp. 873-+, Sep. 2015.

Yu A.C.H. et al. "Eigen-Based Clutter Filter Design for Ultrasound Color Flow Imaging: A Review," IEEE Transactions on Ultrasonics Ferroelectrics and Frequency Control, Article vol. 57, No. 5, pp. 1096-1111, May 2010.

Yiu, Billy Y.S. et al., "Vector Projectile Imaging: Time-Resolved Dynamic Visualization of Complex Flow Patterns", Ultrasound in Med. & Boil., vol. 40, No. 9, pp. 2295-2309, 2014.

* cited by examiner

SYSTEMS AND METHODS FOR REMOVING NOISE-INDUCED BIAS IN ULTRASOUND BLOOD FLOW IMAGING

CROSS-REFERENCE TO RELATED APPLICATIONS

This application represents the national stage entry of PCT/US2019/042594 filed on Jul. 19, 2019 and claims the benefit of U.S. Provisional Patent Application Ser. No. 62/700,424, filed on Jul. 19, 2018, and entitled "SYSTEMS AND METHODS FOR REMOVING NOISE-INDUCED BIAS IN ULTRASOUND BLOOD FLOW IMAGING," the contents of which is herein incorporated by reference in its entirety.

STATEMENT REGARDING FEDERALLY SPONSORED RESEARCH

This invention was made with government support under CA214523 awarded by the National Institutes of Health. The government has certain rights in the invention.

BACKGROUND

The emergence of ultrafast ultrasound imaging has substantially promoted the development of high frame-rate blood flow imaging. The large number of Doppler ensembles that can be acquired in a short period of time using ultrafast ultrasound imaging highly increases the Doppler sensitivity of blood flow in small vessels. The rich spatial-temporal information provided in high frame-rate imaging can also be beneficial for separation of blood and tissue signals, and for robust tissue clutters rejection, which is particularly essential for high resolution and high sensitivity microvessel imaging. However, the high frame-rate ultrasound imaging is typically achieved by transmitting unfocused or weakly-focused ultrasound waves, such as plane waves and diverging waves, and thus the signal-to-noise ratio (SNR) and contrast-to-noise ratio (CNR) can deteriorate very fast, especially for the mid-to-deep range of the image. Therefore, the suppression or rejection of such noise bias in high-frame rate blood flow imaging is essential to improve the small vessel image quality and to facilitate the microvessel imaging research and clinical application.

SUMMARY OF THE DISCLOSURE

The present disclosure addresses the aforementioned drawbacks by providing a method for removing a noise-induced bias from ultrasound data in order to reconstruct an image depicting blood flow in which the noise-induced bias is removed. The method includes accessing with a computer system, ultrasound frame data containing frames of ultrasound data acquired with different transmitting angles. The computer system then forms a first group of ultrasound frame data by selecting a first number of the frames of ultrasound data for the first group, and a second group of ultrasound frame data by selecting a second number of the frames of ultrasound data for the second group. The computer system then reconstructs a first compounded image by compounding the frames of ultrasound data in the first group, and a second compounded image by compounding the frames of ultrasound data in the second group. The computer system then produces first blood flow signal data by clutter filtering the first compounded image and second blood flow signal data by clutter filtering the second compounded image. A blood flow image is then reconstructed with the computer system by computing a correlation between the first blood flow signal data and the second blood flow signal data, the blood flow image depicting blood flow in which noise-induced bias has been removed.

It is another aspect of the present disclosure to provide a method for removing a noise-induced bias from ultrasound data in order to reconstruct an image depicting blood flow in which the noise-induced bias is removed. The method includes accessing with a computer system, ultrasound data acquired with an ultrasound system. The computer system forms a first group of ultrasound frame data by selecting a first number of frames of the ultrasound data for the first group, and a second group of ultrasound frame data by selecting a second number of frames of the ultrasound data for the second group, wherein the first number is equal to the second number. The computer system then reconstructs a first image from the ultrasound data in the first group, and a second image from the ultrasound data in the second group. The computer system then produces first blood flow signal data by clutter filtering the first image and second blood flow signal data by clutter filtering the second image. A blood flow image is then reconstructed with the computer system by computing a correlation between the first blood flow signal data and the second blood flow signal data, the blood flow image depicting blood flow in which noise-induced bias has been removed.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are systems and methods for removing the bias induced by noise from power Doppler images to achieve improvements of microvessel image contrast. In general, the systems and methods described in the present disclosure can significantly and effectively suppress noise in blood flow images, and thus improve the signal-to-noise ratio ("SNR") and contrast-to-noise ratio ("CNR") of blood flow imaging techniques. The systems and methods described in the present disclosure can be beneficially applied to ultrafast ultrasound imaging techniques (e.g., plane wave based or diverging wave based ultrasound imaging techniques) for the purpose of noise reduction.

In one example, the noise can be suppressed by utilizing the characteristics of uncorrelated noise in the ultrasound image from data acquired or compounded at different transmitting angles. In another example, the noise can be suppressed due to the lack of correlation between adjacent ultrasound images, while the blood flow signal is correlated given the sufficiently high frame-rate and can be extracted for high quality blood flow imaging. These example implementations may also be combined, as will be described below.

As noted, the systems and methods described in the present disclosure remove or otherwise reduce the bias due to noise that contaminates power Doppler microvessel images. This bias, which contaminates the visual appearance of the images, can be regarded in some instances as noise, even though it differs from traditional noise. The images resulting from the systems and methods described in the present disclosure show significant improvement in visual quality and, with the bias removed, have the visual appearance of having been denoised. The contrast ratio ("CR") between the signal and the background can be calculated as, $$CR = \frac{\overline{S}_{blood}}{\overline{S}_{background}}; \quad (1)$$

in power Doppler images. In some instances, the CR may be referred to as "SNR." For simplicity, and to be consistent with practices in the field of ultrasound imaging, similar terminology may be used in the present disclosure, such that the terms "noise suppression" and "noise rejection" can be used to mean suppression of noise bias, unless otherwise stated.

High frame-rate blood flow ultrasound imaging methods typically transmit multiple unfocused ultrasound waves sequentially (e.g., plane waves or diverging waves) with different steering angles, and then coherently add the frame data acquired with different transmitting angles to generate a compounding image with higher SNR, contrast, and resolution.

Figure 1:
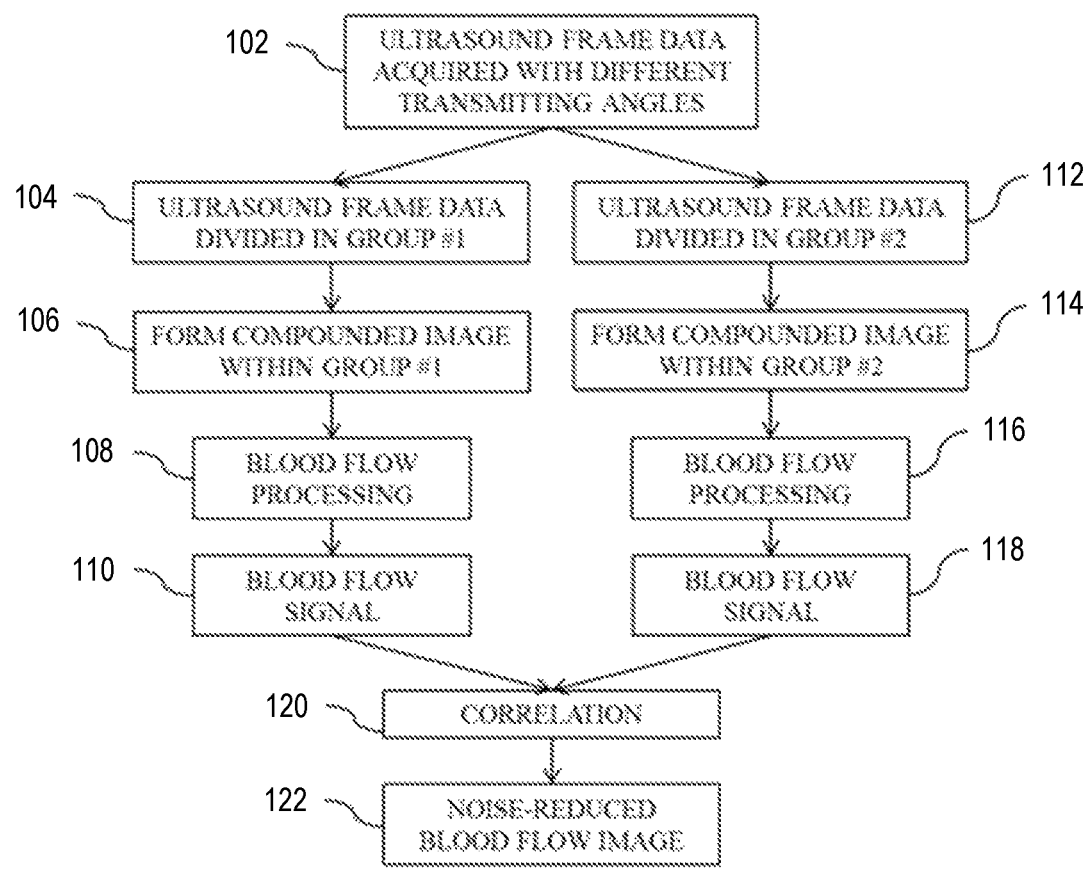
FIG. 1 is a flowchart setting forth the steps of one example method for producing a blood flow imaging in which noise-induced bias has been removed or otherwise reduced.

The systems and methods described in the present disclosure modify the compounding strategy and utilize the uncorrelated characteristics of noise in images of different steering angles to suppress the noise, or noise bias, in blood flow imaging. Referring now to FIG. 1, a flowchart is illustrated as setting forth the steps of an example method for producing a noise-reduced blood flow image. The method includes providing ultrasound frame data to a computer system, as indicated at step 102. The ultrasound frame data can be provided by accessing previously acquired ultrasound frame data from a memory or other data storage, or can include acquiring the ultrasound frame data with an ultrasound system and accessing that data with the computer system, which may be a part of the ultrasound system. In any event, the ultrasound data are acquired with different transmitting angles.

Figure 2:
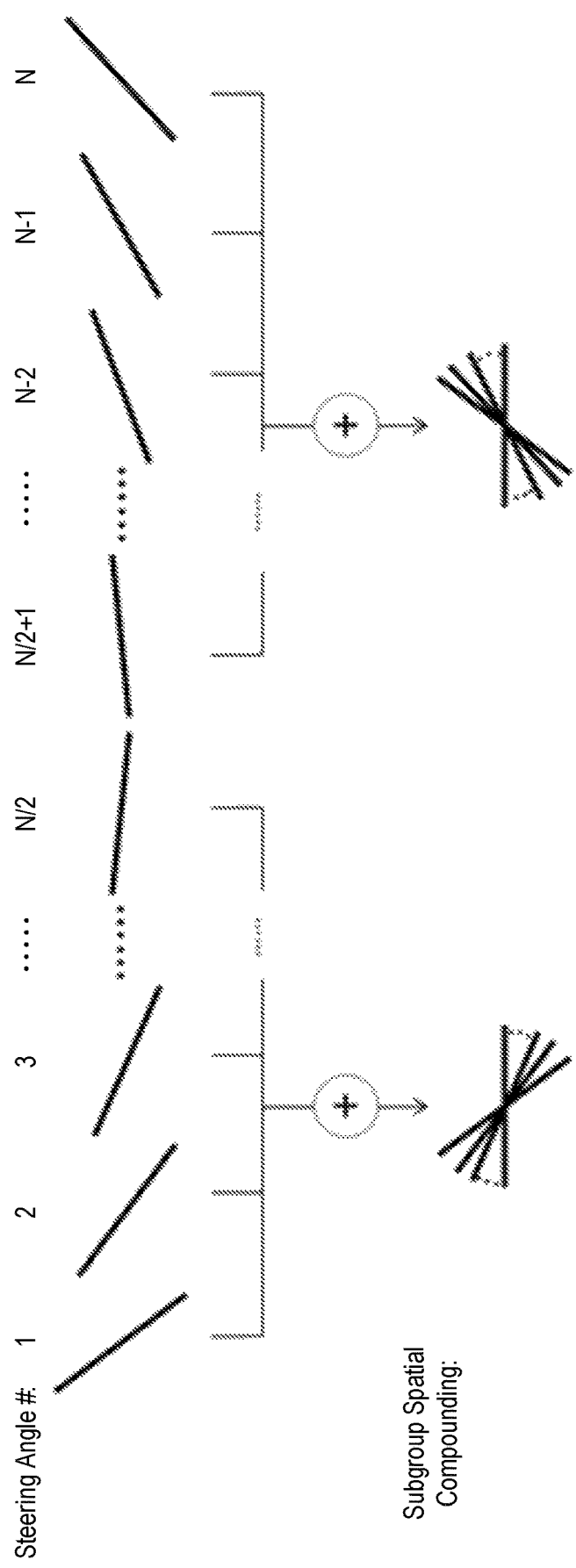
FIG. 2 is an example of an imaging sequence that uses different steering angles for image compounding.

An example of such ultrasound frame data is represented in FIG. 2, which shows ultrasound frame data for N, different steering angles for compounding imaging, where N can be either even or odd. The ultrasound frame data acquired with different steering angles is divided into two non-overlapped groups, as indicated at steps 104 and 112. As an example, assume N is even, and the first group may contain N/2 frame data acquired with angle numbers from 1 to N/2, and the second group contains the other N/2 frame data with angle numbers from (N/2)+1 to N. The way the ultrasound frame data are divided into two groups can be arbitrary. For instance, the ultrasound frame data do not need to be evenly distributed in the two groups; rather, one group may contain any number of the frame data while the other group contains the rest of frame data. In this example, the two groups of ultrasound frame data are formed, however, such that there is no frame overlapping between the two groups. In other implementations, the two groups of ultrasound frame data may be partially overlapped. For instance, the two groups of ultrasound frame data may have at least one non-overlapping frame.

Image compounding is performed individually in each group, which means that for each group the frame data of the different angles are coherently added to produce a compounded image or set of compounding images, as indicated at steps 106 and 114. For instance, a first compounded image, or set of compounded images, can be produced using the frame data from the first group, and a second compounded image, or set of compounded images, can be produced using the frame data in the second group. In this way, the originally acquired ultrasound data are compounded into two data sets.

For the first compounded image and the second compounded image, or sets of such images, blood flow processing is performed at steps 108 and 116, respectively, in order to perform tissue clutter filtering. The blood flow processing produces a first blood flow signal from the first compounded image, as indicated at step 110, and a second blood flow signal from the second compounded image, as indicated at step 118. The tissue clutter filtering can be implemented by any type of ultrasound clutter filters, including high-pass temporal filters, regression-based filters, eigen-based clutter filters, SVD-based filters, and so on. The remaining data matrix obtained after clutter filtering includes blood signal and noise for each group, which can be represented by, $$S_1(x,y,i) = S_{B1}(x,y,i) + n_1(x,y,i) \quad (2);$$

$$S_2(x,y,i) = S_{B2}(x,y,i) + n_2(x,y,i) \quad (3);$$

where $S_{B1}$ and $S_{B2}$ are the blood signals from first and second groups respectively, $n_1$ and $n_2$ are the corresponding noise in the two groups, x and y correspond to lateral and axial dimension, respectively, and i corresponds to the temporal dimension (i.e., different frames of post-compounded images). An estimate of the noise-reduced power Doppler image is generated using a correlation in slow time between the blood flow signals from the two groups, as indicated at step 120. As one example, the correlation may be calculated as the inner product of the two sets of blood flow signals along slow time dimension, which can be expressed as, $$\text{Corr}(x, y) = \sum_{i=1}^{N} S_1(x, y, i) S_2^*(x, y, i) = \quad (4)$$

$$\sum_{i=1}^{N} S_{B1}(x, y, i) S_{B2}^*(x, y, i) + \sum_{i=1}^{N} n_1(x, y, i) n_2^*(x, y, i) +$$

$$\sum_{i=1}^{N} S_{B1}(x, y, i) n_2^*(x, y, i) + \sum_{i=1}^{N} S_{B2}^*(x, y, i) n_1(x, y, i);$$

where N is the ensemble size (i.e., the number of ultrasound data frames). The noise is independent with zero-mean and uncorrelated between frame data of different steering angles, and thus is also uncorrelated between the blood flow signals compounded from the two groups of frame data, while the tissue or blood signals are spatially correlated. Therefore, the correlation of the noise should has zero-expectation, $$E\left[\sum_{i=1}^{N} n_1(x, y, i) n_2^*(x, y, i)\right] = 0. \quad (5)$$

Given that the signal and noise are also uncorrelated, the multiplicative terms of signal and noise (i.e., $$\sum_{i=1}^{N} S_{B1}(x, y, i) n_2^*(x, y, i) + \sum_{i=1}^{N} S_{B2}^*(x, y, i) n_1(x, y, i)$$

can also have zero-expectation. The remaining data after the correlation is performed in step 120 is, therefore, generally the correlation of pure blood flow signals from the two groups. Given that $S_{B1}(x,y,i)$ and $S_{B2}(x,y,i)$ are the ultrasound signals reflected from the blood flow with acoustic waves insonifying at different angles, the correlation of which can provide an estimation of the blood flow power Doppler image, as, $$E[PD_B(x, y)] \approx E[\text{Corr}(x, y)] = E\left[\sum_{i=1}^{N} S_{B1}(x, y, i) S_{B2}^*(x, y, i)\right]. \quad (6)$$

The acquired ultrasound data can be any suitable form, including ultrasound radio-frequency ("RF") data or in-phase quadrature ("IQ") data. In the case of IQ data, correlation of the two blood flow signals generally produces a complex image, which may be further processed to obtain the final blood flow power Doppler image in step 122. In one example, the absolute value of the complex image can be obtained as the final blood flow power Doppler image. In another example, the real part of the complex image, with the negative values set to zeros, may be used as the final power Doppler image. In general, the amount of noise suppression will increase with ensemble size.

The methods described in the present disclosure take advantage of the uncorrelated noise between compounded images from frame data obtained with different steering angles. Although the way the ultrasound frame data are separated into the two groups can be arbitrary, the details of the separation can determine the shape of point spread function ("PSF") of the compounded images. Thus, certain separations can be particularly beneficial for the reduction of incoherent artifacts in the blood flow imaging. For example, a separation such that one group contains the frame data of the first N/2 transmitting angles (number 1 to N/2) and the other group contains the rest (number (N/2)+1 to N), has the maximum difference of transmitting angle between compounded images, and thus may maximize the incoherence of angle-dependent artifacts (e.g., reverberation, grating, and side lobes). In this way, these kinds of incoherent artifacts may be suppressed when performing the correlation operation.

Although the methods described above are described within the context of spatial compounding imaging, they can also be applied to other imaging strategies where noise is uncorrelated between the two groups of data sets. Examples of such imaging strategies include, but are not limited to, focused beam imaging, wide beam imaging, zone imaging, plane wave imaging, diverging wave imaging, synthetic aperture imaging, or combinations of these different imaging methods.

For the suppression of incoherent artifacts (e.g., reverberation, grating and side lobes), the ultrasound imaging method can be arbitrary, including but not limited to spatial compounding imaging, focused beam imaging, wide beam imaging, zone imaging, plane wave imaging, diverging wave imaging, synthetic aperture imaging, or combinations of these different imaging methods, provided that the PSFs are different between the two groups of data sets. As one example, an ultrafast synthetic transmit aperture ("USTA") imaging technique can be used where ultrasound signals from different sub-apertures can be separated into different groups and the correlation between groups can be used to generate microvessel blood flow images with suppression of background noise and incoherent artifacts. Examples of USTA imaging techniques are described in co-pending patent application Ser. No. 16/333,861, which is herein incorporated by reference in its entirety. For each of the imaging strategies, the imaging settings (e.g., steering angles, focal depth, F number, transmit and receive apertures, received filters) can be adjusted to modify the PSFs of the two groups of data sets for better suppression of artifacts, and thus for improvement of the imaging resolution while performing the correlation operation.

The noise suppression methods described in the present disclosure can be applied to blood flow signals obtained using any kind of clutter filters, including but not limited to SVD-based clutter filters. For SVD-based clutter filtering, the methods described in the present disclosure can be applied to a block-wise local SVD filtering technique.

Figure 3:
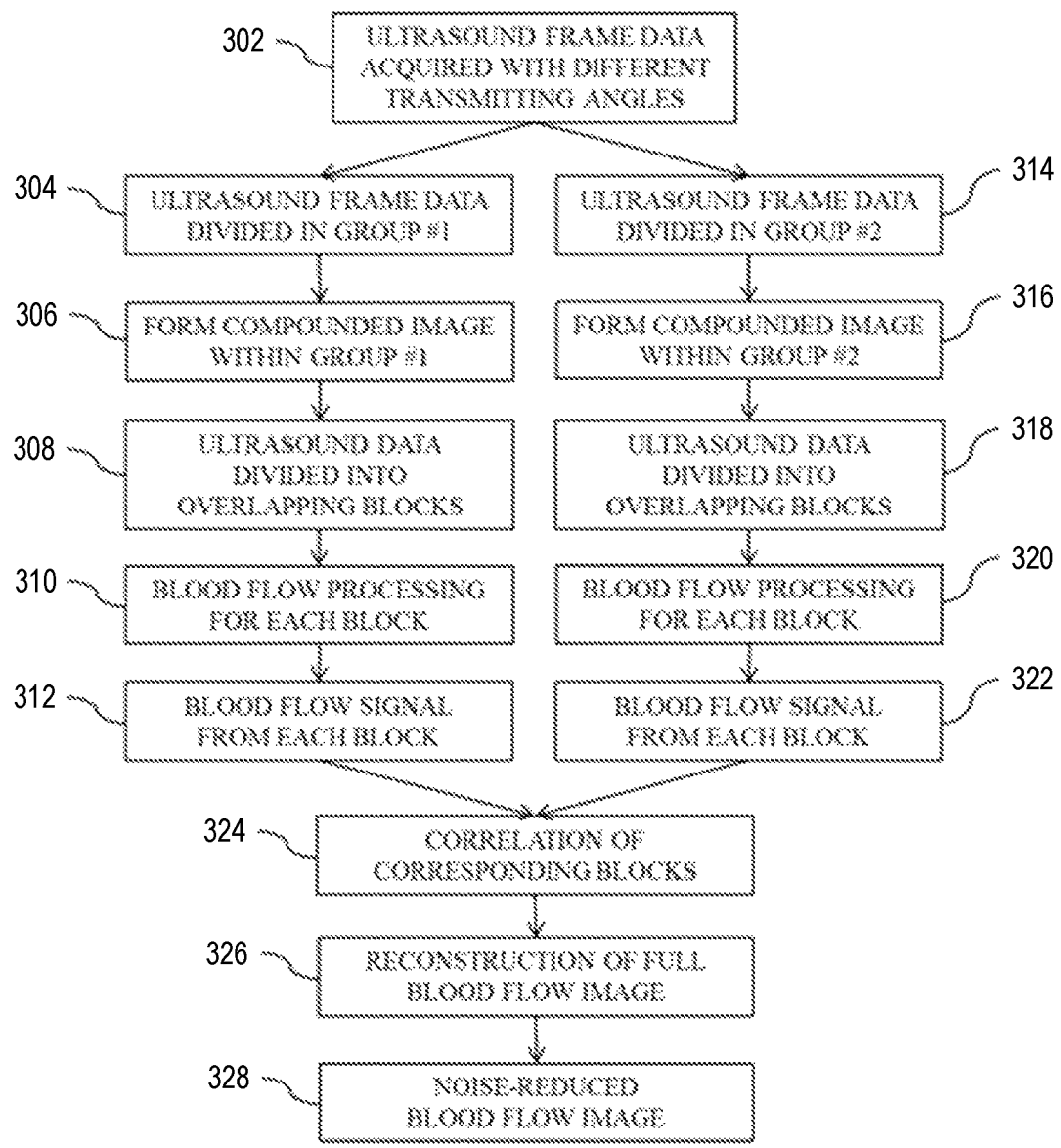
FIG. 3 is a flowchart setting forth the steps of one example method for producing a blood flow imaging in which noise-induced bias has been removed or otherwise reduced, in which block-wise processing is implemented.

Referring now to FIG. 3, is a flowchart is illustrated as setting forth the steps of an example method for performing noise suppression in block-wise local SVD filtering for high-resolution blood flow imaging. The frame data acquired with different steering angles in step 302 are divided into two non-overlapped groups in steps 304 and 314. Coherent image compounding is performed individually for the two groups in steps 306 and 316 in order to generate first and second sets of compounded ultrasound data, respectively. Then these first and second sets of compounded ultrasound data are divided into overlapping spatial blocks at steps 308 and 318, respectively. SVD is performed in each block, as indicated at steps 310 and 320. As one example, SVD can be performed with adaptive determination of low-cutoff singular value threshold for tissue rejection. The determination of high-cutoff singular value thresholds may not be necessary because the noise will be cancelled out by correlation of the blood flow signals for each block.

The correlation of corresponding blocks in the first and second groups is computed, as indicated at step 324. Then the processing results for each block are redundantly combined in step 326 to reconstruct a high-quality noise-reduced blood flow image, as indicated at 328.

Analogous to correlating the corresponding frames in the two groups without time delay (indicated by Eqn. (6)), an extension of this method is that the correlation can also be calculated between the two groups of signals with a small time delay, in this case Eqn. (4) can be rewritten as, $$\text{Corr}_t(x, y) = \sum_{i=1}^{N-t} S_1(x, y, i+t) S_2^*(x, y, i); \quad (7)$$

where t is an integer indicating the number of delay frames. In these implementations, the frame rate should preferably be selected to be high enough to ensure that the blood flow signal does not de-correlate significantly between the correlating frames. The correlating result is again an estimation of the power Doppler image. The correlation results with different time delay (e.g., t=0, ±1, ±2, . . . ) can also be added together to further enhance the imaging resolution, SNR, and CNR, as, $$PD_B(x, y) \approx \sum_t \text{Corr}_t(x, y), \text{ where } t \text{ can be } 0, \pm 1, \pm 2, \ldots . \quad (8)$$

In one particular example, t can be 0 and 1 the power Doppler image can be obtained as follow, $$PD_B(x, y) \approx \sum_{t=0,1} \text{Corr}_t(x, y) \quad (9)$$
$$= \sum_{i=1}^{N} S_1(x, y, i) S_2^*(x, y, i) + \sum_{i=1}^{N-1} S_2(x, y, i) S_1^*(x, y, i+1) ;$$

which may improve the suppression of noise and enhance the resolution of the power Doppler image, as compared with the one indicated by Eqn. (6).

The noise suppression methods described in the present disclosure can also be incorporated into accelerated SVD filtering techniques, such as those described in co-pending U.S. Patent Application Publication No. US 2018/0220997, which is herein incorporated by reference in its entirety. Such accelerated SVD filtering techniques can include randomized SVD ("rSVD") filtering and randomized spatial downsampling SVD filtering, or combinations thereof. By splitting the original ultrasound data into two sets and correlating the blood flow signals obtained using either or both of the accelerated SVD methods, the high-quality noise-reduced blood flow imaging may be implemented in real-time.

The noise suppression methods described in the present disclosure divide the frame data with different transmitting angles into two non-overlapped groups. However, it will be appreciated that the ultrasound frame data may also be divided into a number of groups that is larger than two. Each group should preferably contain at least one frame data from a certain transmitting angle, and the number of frames in each group does not have to be the same. When only one frame data is included in each group, the image compounding step is not necessary. Blood flow processing is performed within each group to reject tissue clutters. Then, correlation of the blood flow signals can be performed in pairs and the results can be averaged to generate a final blood flow image. For example, the original ultrasound frame data of N transmitting angles can be divided in to N groups with each group containing one frame data. In this example, correlation is performed between every two groups (there are totally $C_2^N$ combinations of the two groups) to produce blood power Doppler images, and all of the power Doppler images can be added to obtain a high SNR and CNR blood flow image.

Although the noise suppression methods described in the present disclosure are described within the context of two-dimensional imaging, the methods can also be extended to three-dimensional, or even higher dimensional, imaging. In these cases, the three-dimensional or higher dimensional ultrasound data can be split into small groups and correlating in the same way introduced above for the two-dimensional blood flow imaging to suppress the noise, as well as incoherent artifacts. Again, although the noise suppression methods described above are described within the context of non-contrast blood flow imaging, the methods can also be applied to contrast-enhanced ultrasound imaging for noise suppression and image quality improvement.

The systems and methods described in the present disclosure also provide for noise suppression methods that are based on the temporal coherence of the blood flow signal, and lack of correlation of the noise signal, between adjacent ultrasound image frames for high frame rate ultrasound imaging.

Figure 4:
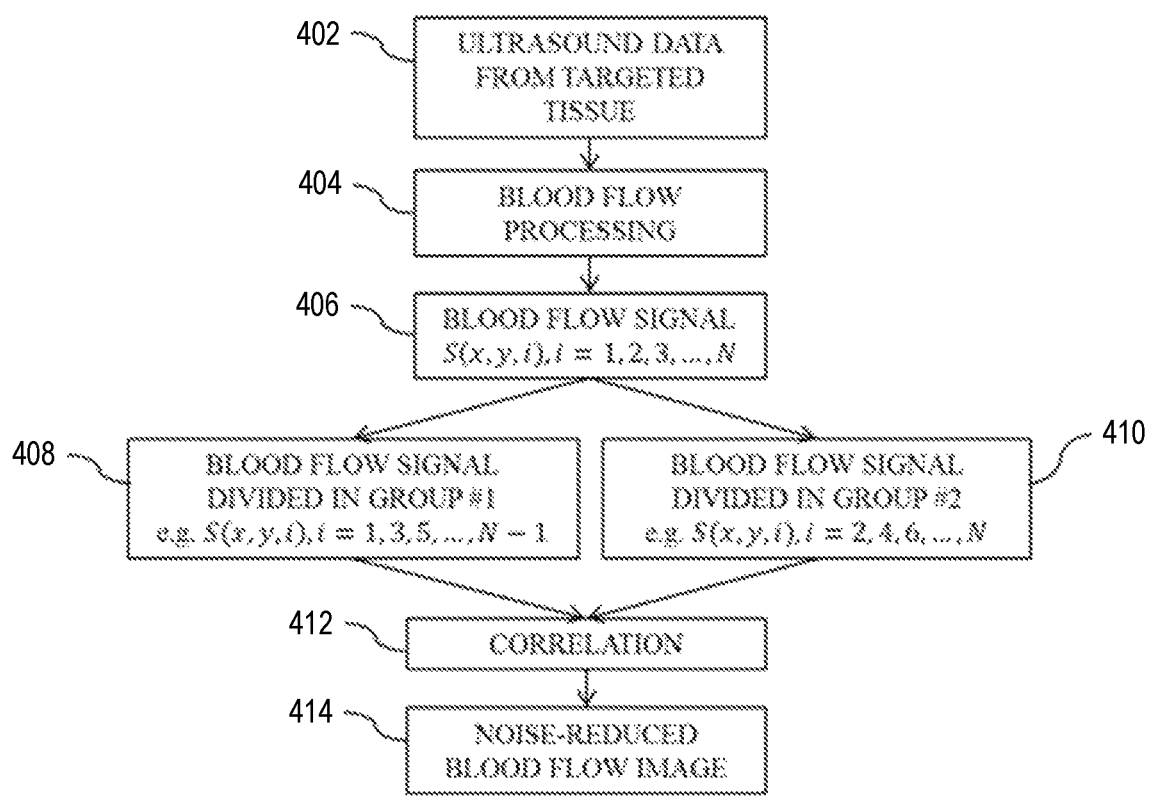
FIG. 4 is a flowchart setting forth the steps of one example method for producing a blood flow imaging in which noise-induced bias has been removed or otherwise reduced.

Referring now to FIG. 4, a flowchart is illustrated as setting forth the steps of an example method for producing a noise-reduced blood flow image. The method includes providing ultrasound data to a computer system, as indicated at step 402. The ultrasound data can be provided by accessing previously acquired ultrasound data from a memory or other data storage, or can include acquiring the ultrasound data with an ultrasound system and accessing that data with the computer system, which may be a part of the ultrasound system. In any event, the ultrasound data can be acquired with an ultrasound system using any suitable type of imaging strategy, including but not limited to plane wave imaging, with or without spatial compounding; diverging wave imaging, with or without spatial compounding; focused-beam ultrasound imaging; synthetic aperture imaging; or the combination of different imaging methods.

Blood flow processing is applied to reject tissue clutters from the original ultrasound data at step 404 in order to generate blood flow signal using at 406. As one example, clutter filters such as temporal high-pass filters, spatial-temporal-based filters, regression-based filters, eigen-based clutter filters, SVD-based filters, and so on can be implemented in the blood flow processing step. The blood flow signal obtained with clutter filtering is generally contaminated with noise, which can be expressed as, $$S(x,y,i)=S_B(x,y,i)+n(x,y,i) \quad (10);$$

where $S_B$ is the blood signal; n is the noise in the acquired data; x and y correspond to lateral and axial dimensions, respectively; and i corresponds to the temporal dimension. As an example, it can be assumed that the number of ultrasound frames is N, so those instances i=1,2, 3, . . . , N.

The frames of blood flow signal S(x,y,i) are then separated into two groups with equal number of frames in each group, as indicated at steps 408 and 410. A correlation of the two groups of blood flow signals in the slow time dimension (i.e., the summation of the conjugate multiplication of the signals over frames) is performed at step 412 in order to produce the noise suppressed power Doppler image at 414.

Figure 5:
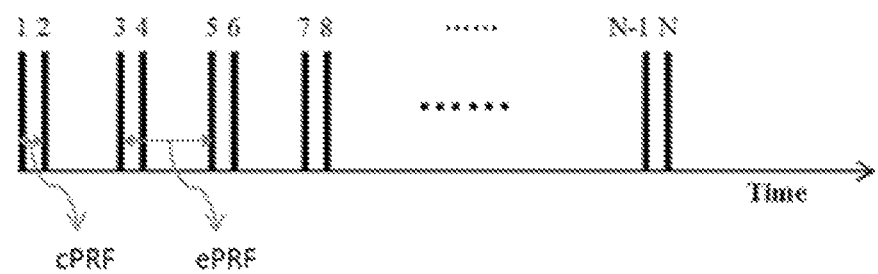
FIG. 5 is an example of an imaging sequence in which ultrasound data are acquired in pairs of ultrasound data frames.

In one example, the ultrasound frames may be continuously acquired with an imaging sequence indicated by FIG. 5, where ultrasound images are collected in pairs with a certain repetition rate that can be referred to as an ensemble pulse-repetition-frequency ("ePRF"). The two frames in each pair are used for calculating the correlation, and have a particularly small pulse-repetition-interval so as to ensure that the blood signal does not de-correlate much between the two frames. The PRF for the frames in each pair can thus be referred to as correlation PRF ("cPRF"), which can be several hundreds to thousands of frames per second. In this case, the clutter filtered blood flow signal can be separated into the following two groups:

Group 1

$$S_1(x, y, i) = S(x, y, 2i-1), \text{ here } i = 1, 2, 3, \ldots, \frac{N}{2}; \quad (11)$$

Group 2

$$S_2(x, y, i) = S(x, y, 2i), \text{ here } i = 1, 2, 3, \ldots, \frac{N}{2}; \quad (12)$$

which means that the first group contains the frames with numbers of 1, 3, 5, . . . , N−1, while that second group contains the frames with numbers of 2, 4, 6, . . . , N. Note that in this case, the original ultrasound data can also be divided into two groups first before going through the blood flow processing unit for clutter filtering separately. The correlation of the signal between the two groups (i.e., Eqns. (11) and (12)) in the slow time dimension can be represented as, $$\text{Corr}(x, y) = \sum_{i=1}^{N/2} S_1(x, y, i) S_2^*(x, y, i) = \\ \sum_{i=1}^{N/2} S_{B1}(x, y, i) S_{B2}^*(x, y, i) + \sum_{i=1}^{N/2} n_1(x, y, i) n_2^*(x, y, i) + \\ \sum_{i=1}^{N/2} S_{B1}(x, y, i) n_2^*(x, y, i) + \sum_{i=1}^{N/2} S_2^*(x, y, i) n_1(x, y, i); \quad (13)$$

where $S_{B1}$ and $S_{B2}$ are the blood signals for the two groups, respectively, and $n_1$ and $n_2$ are the corresponding noise in the two groups. The noise is uncorrelated between the two groups and is also uncorrelated with the blood flow signals, so the noise-reduced power Doppler image can be expressed as, $$E[PD_B(x, y)] \approx E[\text{Corr}(x, y)] = E\left[\sum_{i=1}^{N} S_{B1}(x, y, i) S_{B2}^*(x, y, i)\right]; \quad (14)$$

As mentioned above, in some instances the noise can be even better suppressed with the increase of ensemble size.

Figure 6:
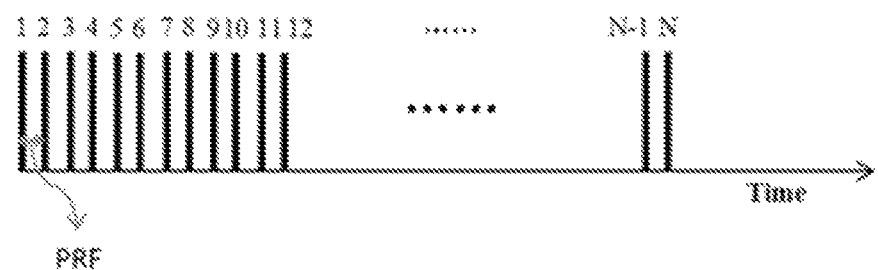
FIG. 6 is an example of an imaging sequence in which ultrasound data are acquired in a series of consecutive ultrasound data frames.

In another example, the ultrasound frames may be continuously acquired using an imaging sequence with constant high frame rate or PRF (e.g., can be several hundreds to thousands of frames per second) as shown in FIG. 6. In this case, the blood flow signals between every two adjacent frames may be sufficiently correlated while the noise is always uncorrelated. So, the blood flow signal obtained with clutter filtering can either be separated into two groups in the same way as above (i.e., Eqns. (11) and (12)), or can be separated into two groups as follows, Group 1: $S_1(x,y,i)=S(x,y,i)$, here $i=1, 2, 3, \ldots, N-1$ (15);

Group 2: $S_2(x,y,i)=S(x,y,i+1)$, here $i=1, 2, 3, \ldots, N-1$ (16).

In this example, the first group contains the frames with numbers of 1, 2, 3, . . . , N−1, while the second group contains the frames with numbers of 2, 3, 4, . . . , N. As described above, the noise can be suppressed due to the lack of correlation, while the power of the blood flow signal can be preserved by calculating the correlation to obtain the high SNR and CNR blood flow power Doppler image.

The order of temporal delay between the two groups of blood flow signals is not limited to one frame, but can be any positive number of frames (e.g., 2, 3, 4) as long as the blood flow signal in the correlating frames remains correlated. The correlation results with different time delay can also be added together to further enhance the imaging resolution, SNR, CNR, or combinations thereof, as, $$PD_B(x, y) \approx \sum_t \text{Corr}_t(x, y) \text{ where } t \text{ can be } 0, \pm 1, \pm 2, \ldots . \quad (17)$$

As described above, the acquired ultrasound data may be in any suitable form, such as ultrasound RF data or IQ data. In the case of IQ data, the correlation of the blood flow signals generally generates a complex image, which may be further processed to obtain the final blood flow power Doppler image, as described above.

Figure 7:
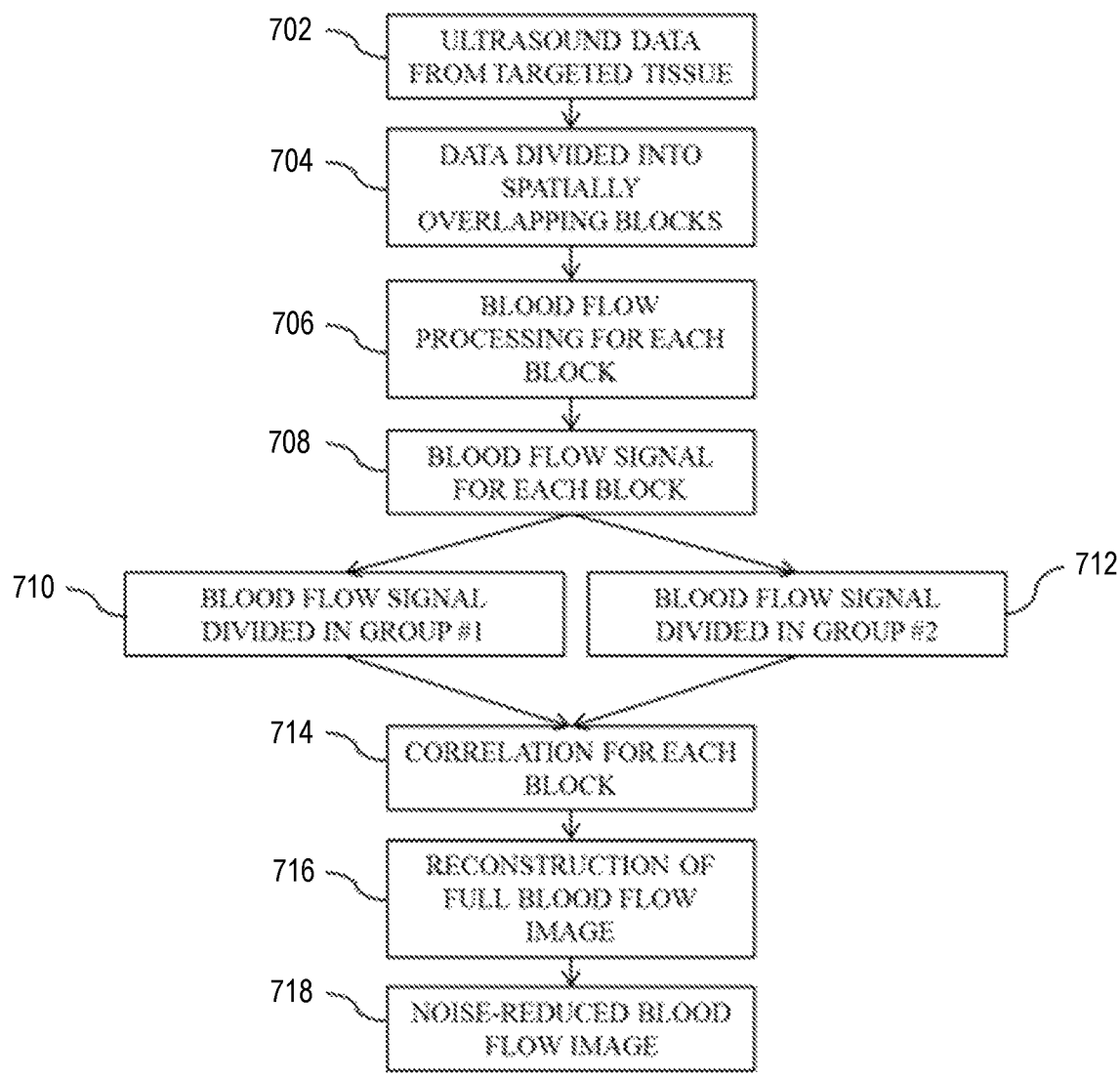
FIG. 7 is a flowchart setting forth the steps of one example method for producing a blood flow imaging in which noise-induced bias has been removed or otherwise reduced, in which block-wise processing is implemented.

As mentioned above, the systems and methods described in the present disclosure can be applied to blood flow signal obtained using any kind of tissue clutter filters, such as high-pass filters and SVD-based clutter filters. For SVD-based clutter filtering, the systems and methods described in the present disclosure can also be beneficially applied to block-wise local SVD filtering techniques to achieve high-resolution and high SNR/CNR microvessel imaging, Referring now to FIG. 7, is a flowchart is illustrated as setting forth the steps of an example method for performing noise suppression in block-wise local SVD filtering for high-resolution blood flow imaging. The method includes providing ultrasound data to a computer system, as indicated at step 702. The ultrasound data can be provided by accessing previously acquired ultrasound data from a memory or other data storage, or can include acquiring the ultrasound data with an ultrasound system and accessing that data with the computer system, which may be a part of the ultrasound system. In any event, the ultrasound data can be acquired with an ultrasound system using any suitable type of imaging strategy, including but not limited to plane wave imaging, with or without spatial compounding; diverging wave imaging, with or without spatial compounding; focused-beam ultrasound imaging; synthetic aperture imaging; or the combination of different imaging methods.

The ultrasound data are spatially divided into overlapping spatial blocks, as indicated at step 704. For each block of data, blood flow processing is performed using SVD filtering, as indicated at step 706. As one example, SVD filtering can be implemented with adaptive determination of low-cutoff singular value threshold to reject tissue clutters. In any event, the blood flow processing results in generating blood flow signal data for each block, as indicated at step 708. The blood flow signal within each block is then temporally separated into two data groups, as indicated at steps 710 and 712. The data can be separated into the two groups as described above.

The correlation for each block between the two groups is then calculated, as indicated at step 714. The determination of high-cutoff singular value threshold may not be necessary because the noise can be suppressed by the correlation operation. Then the processing results for each block are redundantly combined at step 716 to reconstruct the full flied-of-view noise-suppressed blood flow power Doppler image at 718.

As described above, the noise suppression method presented in this section does not require the determination of high-cutoff singular value threshold in SVD process. Therefore, this method can be easily incorporated into the accelerated SVD filtering techniques mentioned above, including rSVD filtering and randomized spatial downsampling SVD filtering, or the combination of the rSVD and randomized spatial downsampling filtering methods, which may facilitate the real-time implementation of the high-quality noise-reduced blood flow imaging.

Similar to the other methods described in the present disclosure, the correlation based noise suppression method can also be extended to three-dimensional or even higher dimensional imaging. These higher dimensional data can be separated into two groups and processed in the same way introduced above for two-dimensional blood flow imaging for noise suppression. Again, although the methods described in the present disclosure have been described in the context of non-contrast blood flow imaging, they can also be applied to the contrast-enhanced ultrasound imaging for noise suppression and image quality improvement.

The systems and methods described in the present disclosure can be combined together to suppress noise-induced bias in blood flow imaging. In one example, the image compounding based method may first be applied to the original ultrasound data, and before adding the correlating frames to generate the power Doppler image, adjacent frame based method can then be performed. In another example, ultrasound data can be divided into two groups based on the subgroup compounding method described above, and the adjacent frame based can first be applied to each group of data for noise bias suppression for each group and then the image compounding based method may be applied thereafter to generate the final power Doppler image.

The above-described correlation-based methods for removing noise bias can significantly reduce noise-induced background bias. In some instances with very low SNR, residual noise may still deteriorate the detection of small vessel signals. In these instances, it would be further advantageous to suppress and/or reject this residual noise. Furthermore, because the slow flow signal can sometimes be weak and lack contrast in conventional blood flow images, enhancement of these slow flow signals would also be advantageous for microvessel visualization and quantification.

Thus, it is one aspect of the present disclosure to provide methods for rejecting residual noise in blood flow images. For example, the phase and magnitude (e.g., absolute value) behavior of the correlating signals can be analyzed and used to remove residual noise from microvessel images based on the difference of phase and magnitude of the noise and blood signals. It is another aspect of the present disclosure the provide methods for enhancing weak slow flow signal to achieve further improvement of microvessel image contrast. For example, the normalized correlation of tissue clutter filtered blood flow signal can be used to produce blood flow images. Using this approach, the background noise is suppressed and, advantageously, the slow and weak blood flow in small vessel can be greatly enhanced.

The presented method here is based on the previously proposed correlation-based microvessel image denoising methods in our recent disclosure (Mayo 2018-048). The method here leverages the phase and magnitude of the correlation signal to further suppress noise. An example of the microvessel image obtained with the new method is shown in FIG. 1*c*, demonstrating robust noise suppression performance over using correlation alone. Two groups of blood flow signals after tissue clutter filtering with equal number of frames are provided for correlation calculation. For each group, the blood flow signal is contaminated with noise, and can be expressed as:

$$S_k(x,y,i)=B_k(x,y,i)+n_k(x,y,i) \tag{18};$$

where $B_k$ is the blood signal; $n_k$ is the noise in the acquired data; k is the group index; x and y correspond to lateral and axial dimensions, respectively; and i=1,2,3, . . . , N corresponds to the temporal dimension and N is the total number of ultrasound frames in each group. The tissue clutter filtered blood flow signal, S(x,y,i) can be obtained using any suitable tissue clutter filters, including but not limited to temporal high-pass filters, spatial-temporal-based filters, regression-based filters, eigen-based clutter filters, and SVD-based filters. In some instances, for SVD-based clutter filtering, the methods described in the present disclosure can be applied to a block-wise local SVD filtering technique, whereas the presented noise suppression methods can be performed individually for each subset of data. Block-wise local SVD filtering techniques are described, for example, in co-pending US 2019/0053780, which is herein incorporated by reference in its entirety.

The original ultrasound data can be divided into multiple groups either before or after tissue clutter filtering. There are various ways to separate the ultrasound data into two groups, as described above. In general, the signals should be separated such that the blood flow signals in the two groups are sufficiently coherent, while the noises are uncorrelated. In one example, the two groups of signals can be obtained by compounding ultrasound frame data separately from different groups of transmitting angles (e.g., angle −10 degree to −1 degree as group 1, and angle 1 degree to 10 degree as group 2). In another example, the sequentially acquired ultrasound frames can be divided into one group containing all the odd number frames, and another group containing all the even number frames. In still another example, the two groups of ultrasound signals can have overlapping numbers, such as:

Group 1: $S_1(x,y,i)=S(x,y,i)$ with $i=1,2,3,\ldots,N-\tau$ (19);

Group 2: $S_2(x,y,i)=S(x,y,i+T)$ with $i=1,2,3,\ldots,N-\tau$ (20).

Here the group 1 includes the frames of number 1,2, 3, ..., N−τ while group 2 includes the frames of number 1+τ, 2+τ, 3+τ, ..., N. When τ=1, the one group can actually be obtained by shifting the other group in the temporal direction by one frame. Using one frame shift is beneficial for maintaining the coherence of the blood flow signal, while theoretically the temporal shift between the two groups can be any other integer frames (such as 0, ±1, ±2, ±3 ... ), as long as the blood flow signal is sufficiently correlated. When τ=0, the correlation of the two groups of signals in the slow time dimension results in a power Doppler ("PD") image. In the methods described in the present disclosure, instead of calculating PD image, the correlation of the given two groups of ultrasound signals in the slow time dimension (i.e., the summation of the conjugate multiplication of the signals over frames) is performed to generate an improved microvessel image, which can be expressed as:

$$\text{Corr}(x, y) = \sum_{i=1}^{N} S_1(x, y, i) S_2^*(x, y, i); \quad (21)$$

Here N represents the ensemble size (e.g., the total number of ultrasound frames) of each group. In some instances, the noise can be assumed to be independent with zero-mean and uncorrelated with the blood flow signal. Therefore, the correlation of the noise and the cross-terms should have zero expectation. As a result, the expectation of Eqn. (21) gives an estimation of a noise-suppressed microvessel image, $$E[UMI(x, y)] \approx E[\text{Corr}(x, y)] = E\left[\sum_{i=1}^{N} B_1(x, y, i) B_2^*(x, y, i)\right]; \quad (22)$$

where UMI indicates the ultrasound microvessel image. A one-time estimation (i.e., an instance) of the correlation (i.e., Eqn. (22)) can still be subject to random noise, which results in residual noise observed in the blood flow image when the SNR is low. It is an aspect of the present disclosure to suppress and/or reject this residual noise to further improve the microvessel blood flow image quality.

The acquired ultrasound data for correlation calculation can be in any suitable form, such as ultrasound radio-frequency ("RF") data or in-phase quadrature ("IQ") data. In one example, the ultrasound data can be IQ data in which the ultrasound signal is a complex-valued signal. In this example, the correlation in Eqn. (22) can be written as:

$$\text{Corr}(x, y) = \sum_{i=1}^{N} S_1(x, y, i) S_2^*(x, y, i) \\ = \sum_{i=1}^{N} A_1(x, y, i) A_2(x, y, i) e^{-j\Delta\theta(x,y,i)} \quad (23)$$

where $\Delta\theta(x,y,i)=\theta_1(x,y,i)-\theta_2(x,y,i)$. The magnitude of summation of complex numbers is generally smaller than the summation of magnitude of the complex numbers. Thus, when $\Delta\theta(x,y,i)=0$ or $\Delta\theta(x,y,i)$ is constant for all i, then the following holds true:

$$|\text{Corr}(x, y)| = \text{Corr}_{envelope}(x, y) = \sum_{i=1}^{N} A_1(x, y, i) A_2(x, y, i); \quad (24)$$

which indicates that the magnitude of the correlation equals to the correlation of the magnitude of the IQ data (that is, the envelope of the complex IQ data or the RF data). Otherwise, $|\text{Corr}(x,y)|<\text{Corr}_{envelope}(x,y)$. Therefore, the correlation of two complex signals generally produces a complex number, which can be defined as, $$\text{Corr}(x, y) = \sum_{i=1}^{N} A_1(x, y, i) A_2(x, y, i) e^{-j\Delta\theta(x,y,i)} = C(x, y) e^{-j\rho(x,y)}; \quad (25)$$

where $C(x,y)$ is the magnitude of the correlation that indicates the similarity between the two signals, and $\rho(x,y)$ is the instantaneous phase of the correlation, which indicates the overall phase difference between the two signals. The instantaneous phase represents the amount of phase rotation that will best align the two signals. The magnitude of the correlation is typically used to produce blood flow images. For blood flow signals, when the imaging frame rate is high, decorrelation in phase is minimal, in which case $C(x,y)$ can well represent the correlation in the magnitude/envelope of the original signals. In another example, if the blood flow speed is constant, then the slow time blood flow signal can be viewed as being mono-frequency modulated, which can be expressed as: $S(x,y,i)=A(x,y,i)e^{-j\omega(x,y)/\Delta t}$. In these instances, the correlation calculation can be expressed as:

$$\text{Corr}(x, y, \tau) = \sum_{i=1}^{N-\tau} S(x, y, i) S^*(x, y, i+\tau) \\ = e^{j\omega(x,y)\tau\Delta t} \sum_{i=1}^{N-\tau} A(x, y, i) A(x, y, i+\tau) \\ = e^{j\omega\tau\Delta t} \text{Corr}_{envelope}(x, y, \tau) \quad (26)$$

where $\Delta t$ is the timespan of two temporal samples, which equals to the reciprocal of the frame rate $\Delta t=1/fr$. Eqn. (26) is similar to the auto-correlation of the blood flow signal with a temporal shift of τ frames. The magnitude of the correlation, $\text{Corr}_{envelope}(x, y, \tau)$ equals the auto-correlation of the envelope of the blood flow signals, which determines the similarity of the blood flow signal after of τ frames' shifting. The instantaneous phase of the correlation, $\omega\tau\Delta t=\omega t/fr$, is determined by the speed of the blood flow and the frame rate of ultrasound imaging for the given temporal shift of τ frames.

For slow flow (i.e., low values of ω) and high frame rate situation, the phase of the correlation $\omega\tau\Delta t$ will be small (mainly located around zeros). For random and independent noise data, however, the phase and magnitude characteristic of the complex correlation is different. Assuming the noise as:

$$n(x,y,i)=A_n(x,y,i)e^{-j\theta_n(x,y,i)} \quad (27);$$

the correlation of the two independent noise data (zero mean, equal variances) can be expressed as:

$$\text{Corr}_n(x, y) = \sum_{i=1}^{N} A_{n1}(x, y, i) A_{n2}(x, y, i) e^{-j\Delta\theta_n(x,y,i)}. \quad (28)$$

The phase of the noise correlation $\text{Corr}_n(x,y)$ can be equally distributed over the full range of angle between $[-\pi, \pi]$. The correlation of slow flow signals typically has a larger magnitude and smaller phase. With the increase of the flow speed, the magnitude of flow correlation gradually decreases and the phase of the flow correlation increases. The noise correlation typically has a small magnitude and a randomly distributed phase.

Figure 8:
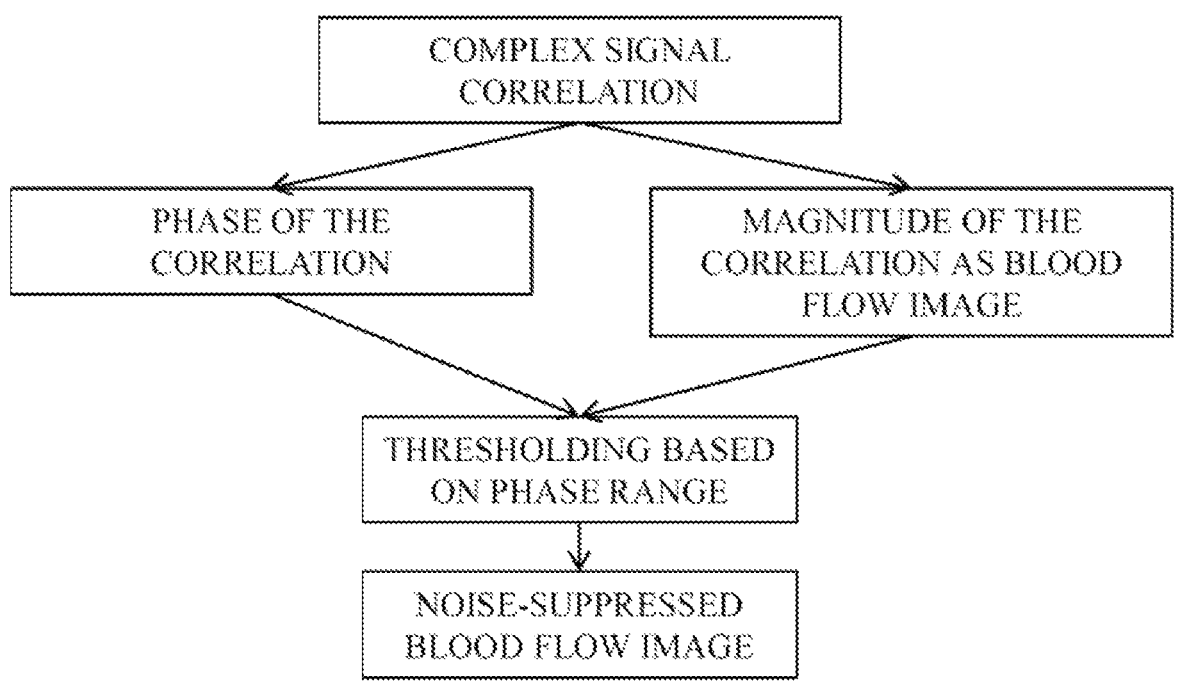
FIG. 8 is a flowchart setting forth the general steps of an example method for reducing residual noise based on correlation phase thresholding.

As described above, the coherent blood flow signals have small correlation phase, while the incoherent noise has random correlation phase equally distributed within $[-\pi, \pi]$. Therefore, based on the difference of correlation phase between noise and blood flow signal, a thresholding can be set to separate blood flow signal from noise based on differences in phase. For example, the correlation phase range of the blood flow signal can be defined as $[-\rho, \rho]$, where $\rho$ is associated with the flow velocity and considered small for the coherent blood flow signal. The magnitude of the correlation can be used to generate the microvessel image. Phase thresholding can then be performed by rejecting image pixels with correlation phase in the range of $[\rho, \pi]$ or $[-\pi, -\rho]$. A flowchart setting forth the general steps of an example method for reducing residual noise based on a correlation phase thresholding is shown in FIG. 8.

As noted above, the methods for reducing residual noise can be applied to ultrasound blood flow signals obtained by any tissue clutter filter, including but not limited to temporal high-pass filters, spatial-temporal-based filters, regression-based filters, eigen-based clutter filters, SVD-based filters, and so on. It is an aspect of the present disclosure that these methods provide particular advantages for use in conjunction with SVD-based clutter filters.

SVD-based clutter filters remove tissue clutters based on the spatial-temporal coherence of the signals: tissue signal is most coherent and resides in the low-order, large singular values. Noise correlation has random phase angle distributed over the range of $[-\pi, \pi]$, and after SVD-based clutter filtering it is contemplated that the remaining noise is more likely to have larger correlation phase. An example of this is elaborated in FIGS. 9A-9F.

Figure 9A:
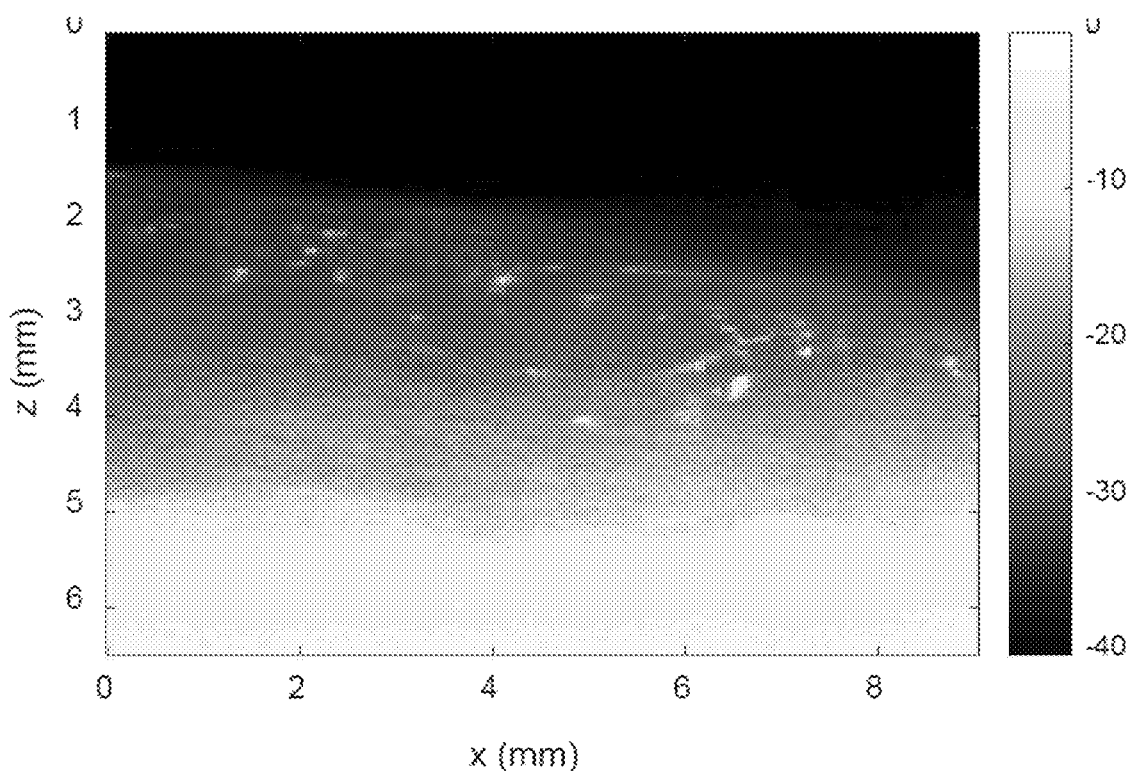
FIGS. 9A-9F show an example of correlation phase thresholding a power Doppler image.
Figure 9B:
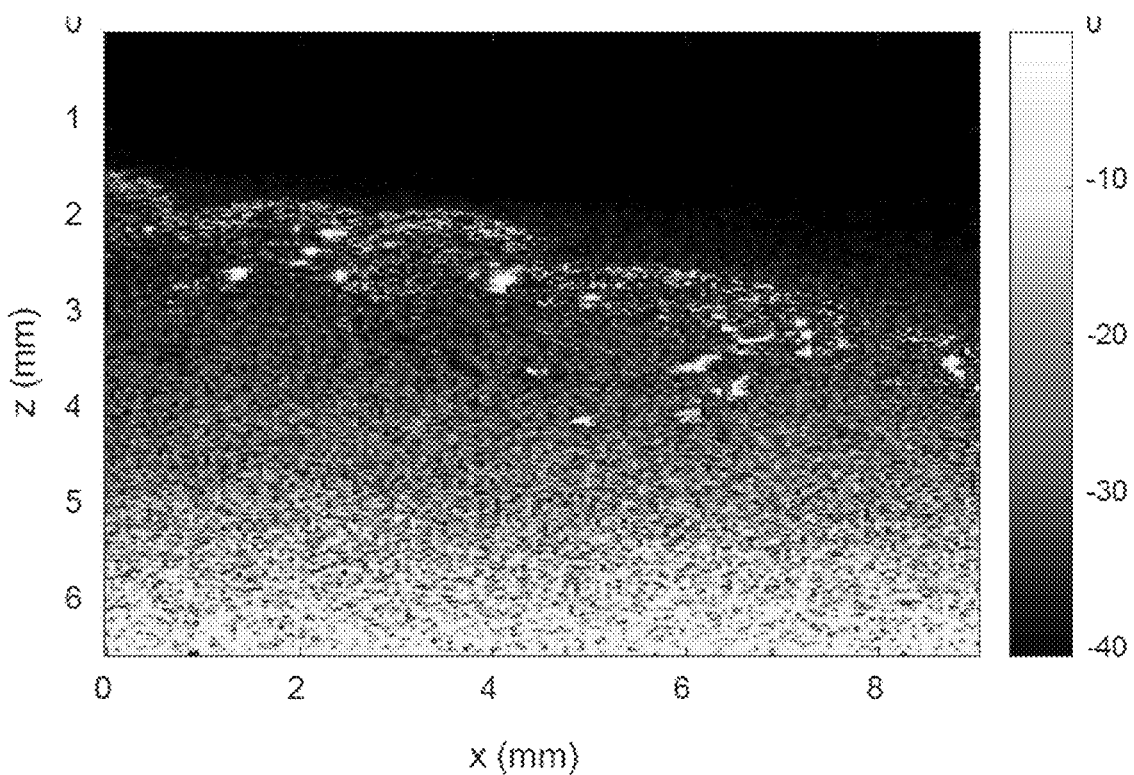
Figure 9C:
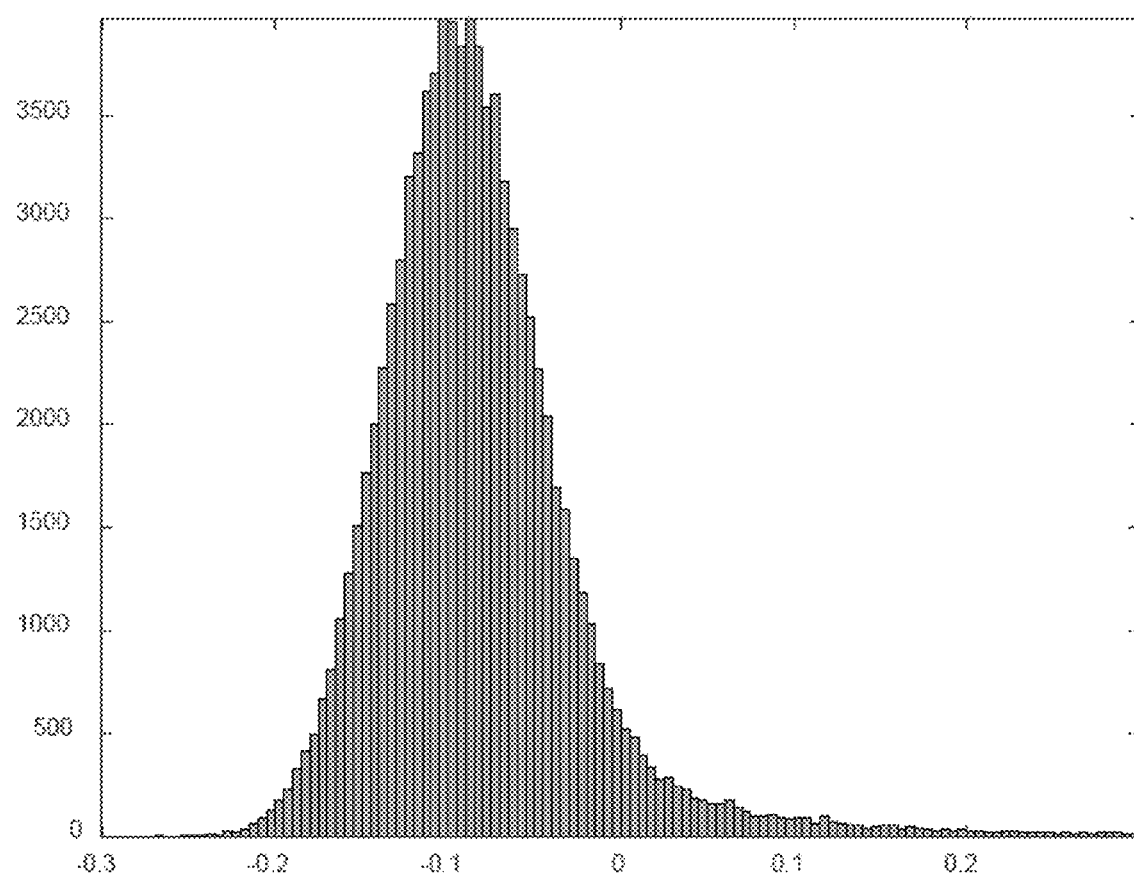
Figure 9D:
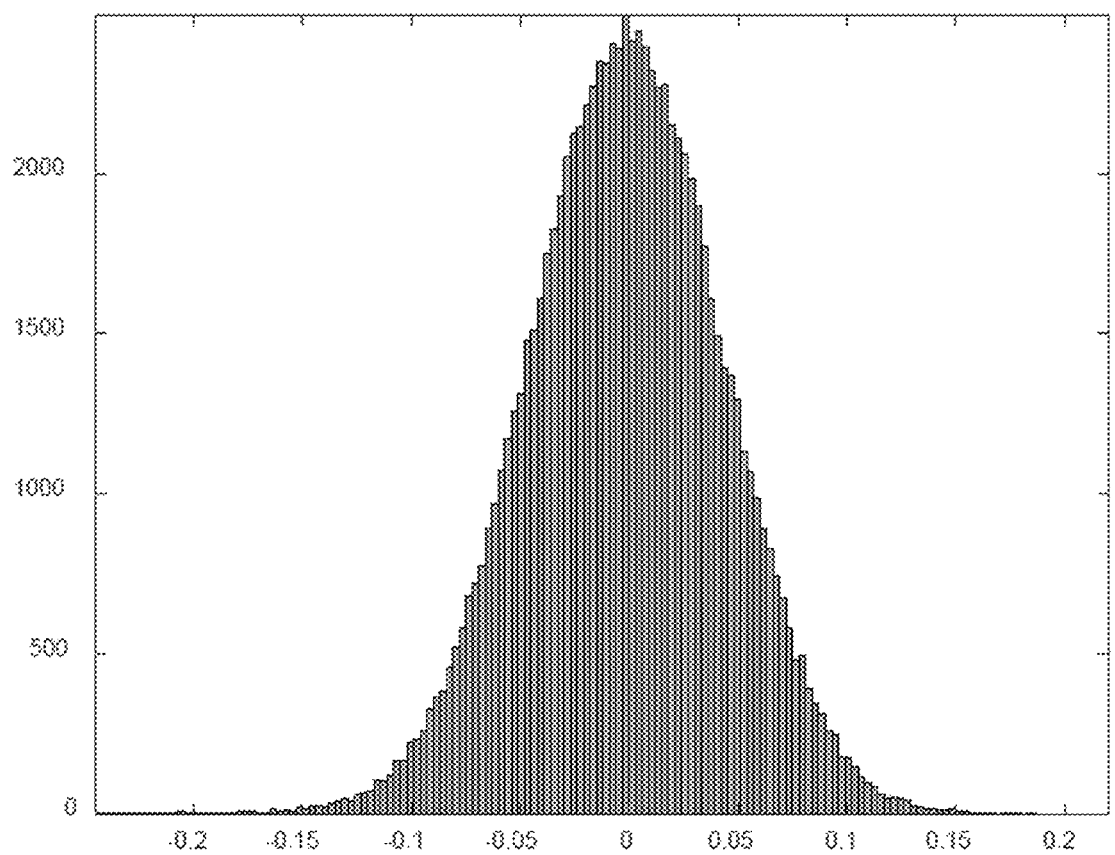
Figure 9E:
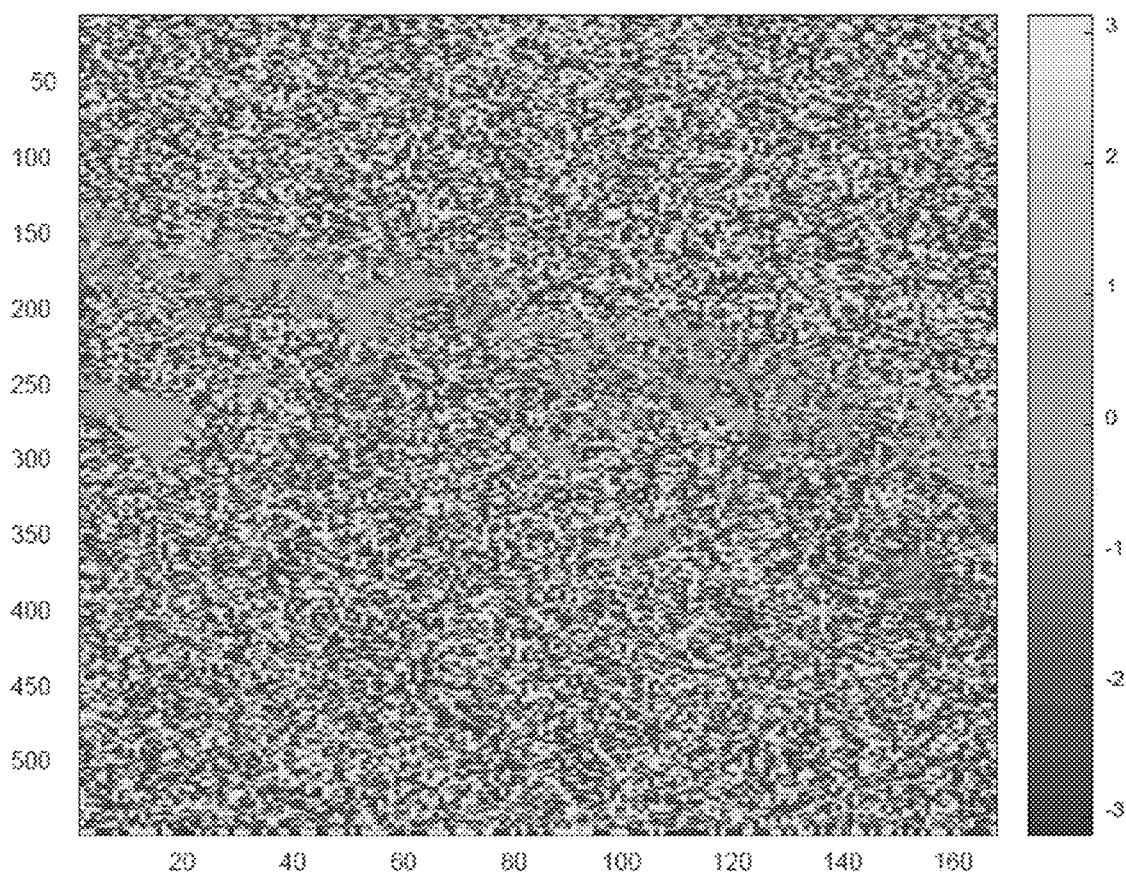
Figure 9F:
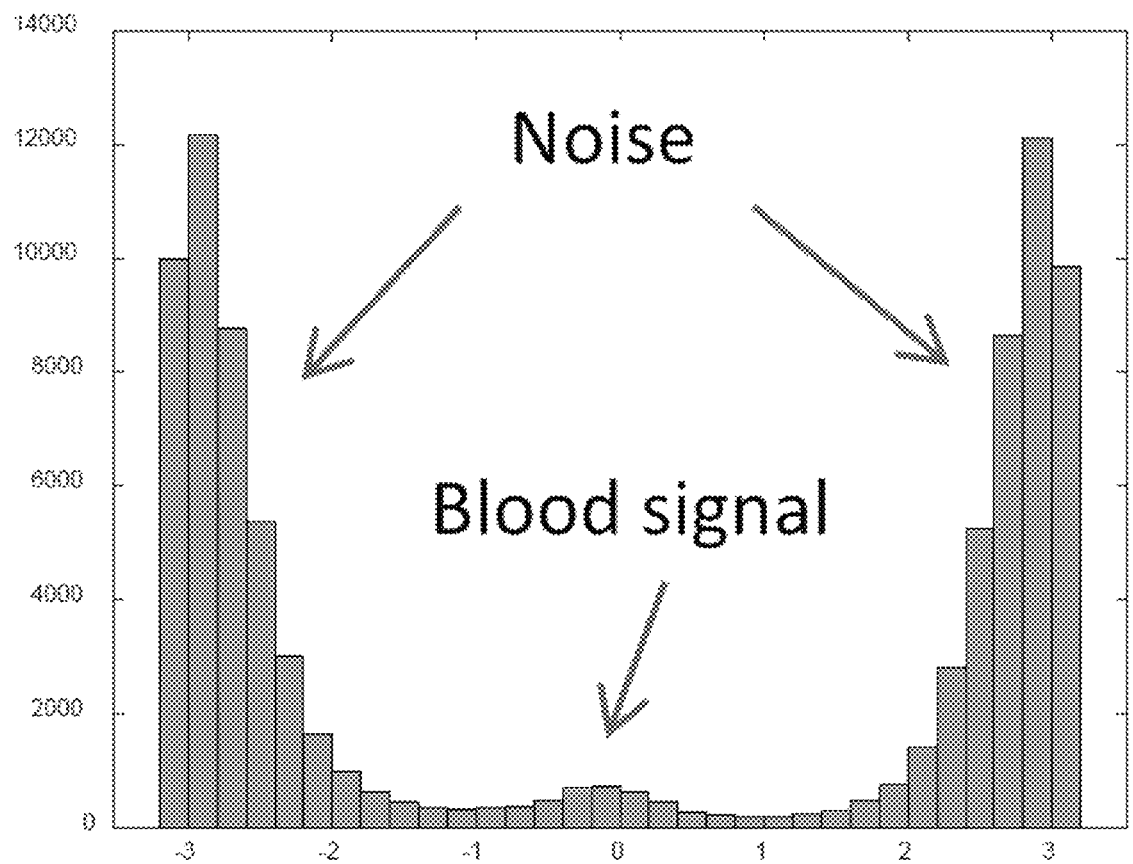

The original power Doppler image obtained by SVD-based clutter filtering is shown in FIG. 9A, where the noise bias is shown to deteriorate the visualization of microvessel structures. FIG. 9B shows the blood flow image obtained by using the magnitude of the signal correlation, where the noise bias is suppressed but the residual noise can still deteriorate the image quality. The histogram of the real part and imaginary part of the correlation is shown in FIGS. 9C and 9D, respectively. While the imaginary part of the noise distributes symmetrically, the real part of the noise does not. Most of the real part values are negative, which means that the correlation phase of most of the noise is located in the range of $[-\pi, -\pi/2]$ or $[\pi/2, \pi]$, as depicted in correlation phase image (FIG. 9E) and the phase histogram (FIG. 9F). FIGS. 9E and 9F also reveal that the blood flow signal has relatively low correlation phase, which indicates the coherence of the blood flow signal as compared with noise. By using a thresholding based on an appropriate phase range (as describe above), most of the background noise can be removed. The cutoff threshold can be adjusted to better separate the residual noise and blood flow signal in the final blood flow image. A low threshold angle will reject more noise pixels, while a higher threshold angle will preserve more blood flow signals.

In general, the presented phase thresholding method can be expressed as applying a weighting to the magnitude of the correlation, thus the final blood flow image can be expressed as, $$UMI(x,y)=w(x,y)\cdot|\text{Corr}(x,y)|=w(x,y)\cdot|C(x,y)e^{-j\rho(x,y)}|=w(x,y)\cdot C(x,y) \quad (29);$$

where $C(x,y)$ is the magnitude of the correlation, $\rho(x,y)$ is the phase of the correlation, and $w(x,y)$ is the weight applied to the blood flow image, which is in general a function of the correlation phase $\rho(x,y)$ and can be expressed as, $$w(x,y)=f\{\rho(x,y)\} \quad (30).$$

This phase thresholding can equivalently be expressed as setting the weight $w(x,y)$ to 1 when the image pixel has a correlation phase within the threshold range, and 0 when the correlation phase is outside the threshold range, as, $$w(x, y) = \begin{cases} 1 & \rho(x, y) \in [-\rho_{th}, \rho_{th}] \\ 0 & \text{otherwise} \end{cases}; \quad (31)$$

where $\rho_{th}$ is the cutoff threshold. Generally speaking, the weight $w(x,y)$ does not necessary to be either 1 or 0; instead, it can be any function of correlation phase and in some instances may be beneficial to have a smooth transition between blood flow signal and noise using an appropriately selected weighting function.

The magnitude of the correlation is typically used as the blood flow image. In other instances the real part can also be used as the blood flow image and has similar image performance when blood flow signal is highly coherent (e.g., low correlation phase). When using the real part of the correlation, the final blood flow image can be expressed as, $$UMI(x,y)=w(x,y)\cdot\text{Re}\{\text{Corr}(x,y)\}=w(x,y)\cdot C(x,y)\cos(\rho(x,y)) \quad (32).$$

Figure 10:
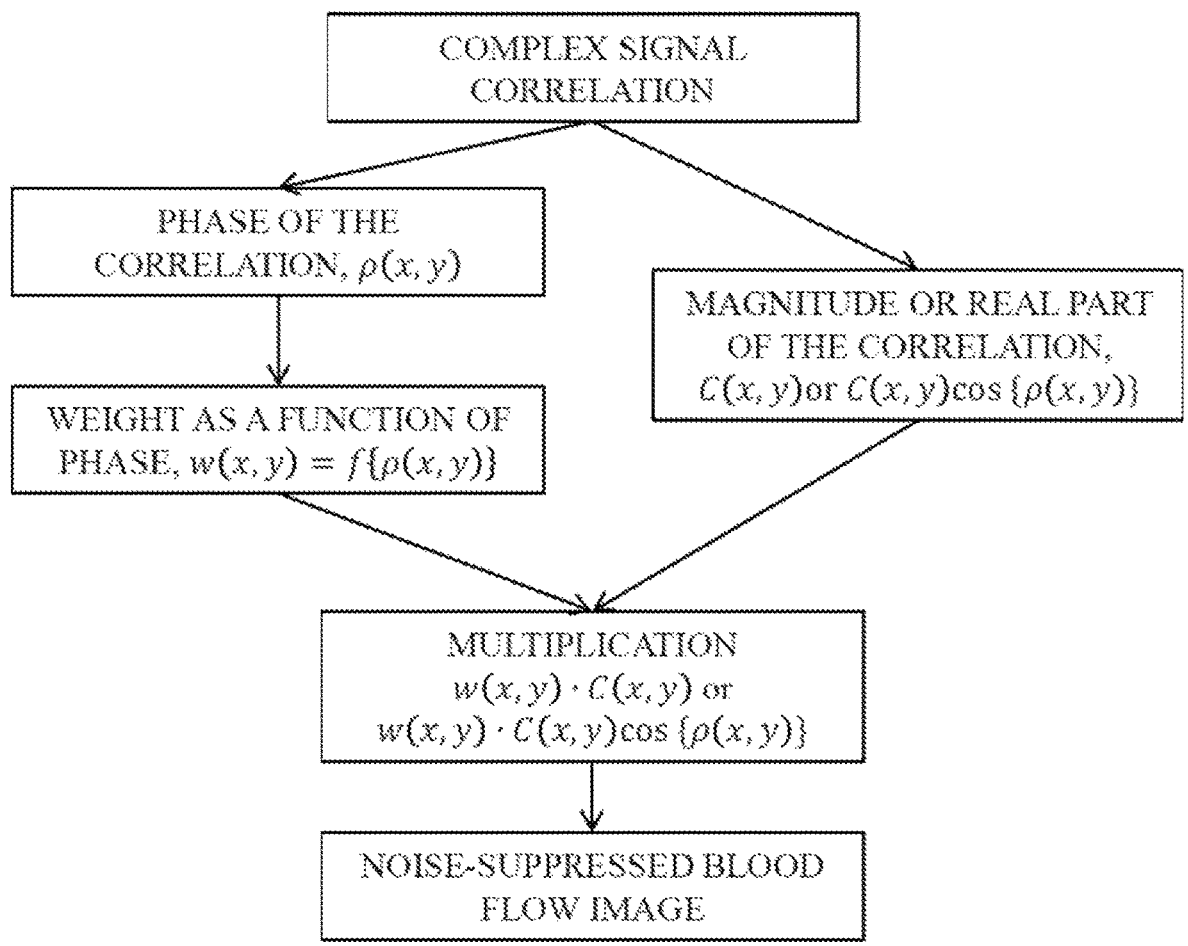
FIG. 10 is a flowchart setting forth the general steps of an example method for reducing residual noise based on a correlation phase thresholding of the magnitude or real part of the correlation.

In one example, when $\rho_{th}=\pi/2$, the final blood flow image in Eqn. (32) is equal to that obtained by taking the real part of the correlation and removing all the negative values. A flowchart setting forth the general steps of an example method for reducing residual noise based on a correlation phase thresholding of the magnitude or real part of the correlation is shown in FIG. 10.

An aliasing effect may occur when the blood flow speed is too high or the ultrasound frame rate is not high enough. As noted above, the correlation phase of the blood flow signal increases with the flow velocity. By thresholding based on the correlation phase only, those fast flow signal may be rejected along with the noise, which would lead to missing blood flow signal in the blood flow image. This loss of information can present as a "hole" inside the larger blood vessel.

To alleviate this effect, in one example, the frame rate can be increased in order to increase the temporal coherence of the blood flow signal, so as to better differentiate the noise and blood flow signal in the phase domain. In another example, considering that the fast blood signal inside the large vessel typically has much higher correlation magnitude as compared with that of noise, the magnitude of the correlation can be utilized to compensate the thresholding or weighting process. For instance, both the phase and magnitude of the correlation can be used to generate the weight w(x,y), so as to remove the noise in the blood flow image while preserving the high magnitude fast flow signals. In this case the weight w(x,y) can be expressed as a function of both phase and magnitude of the correlation, $$w(x,y)=f\{\rho(x,y),C(x,y)\} \quad (33).$$

Figure 11:
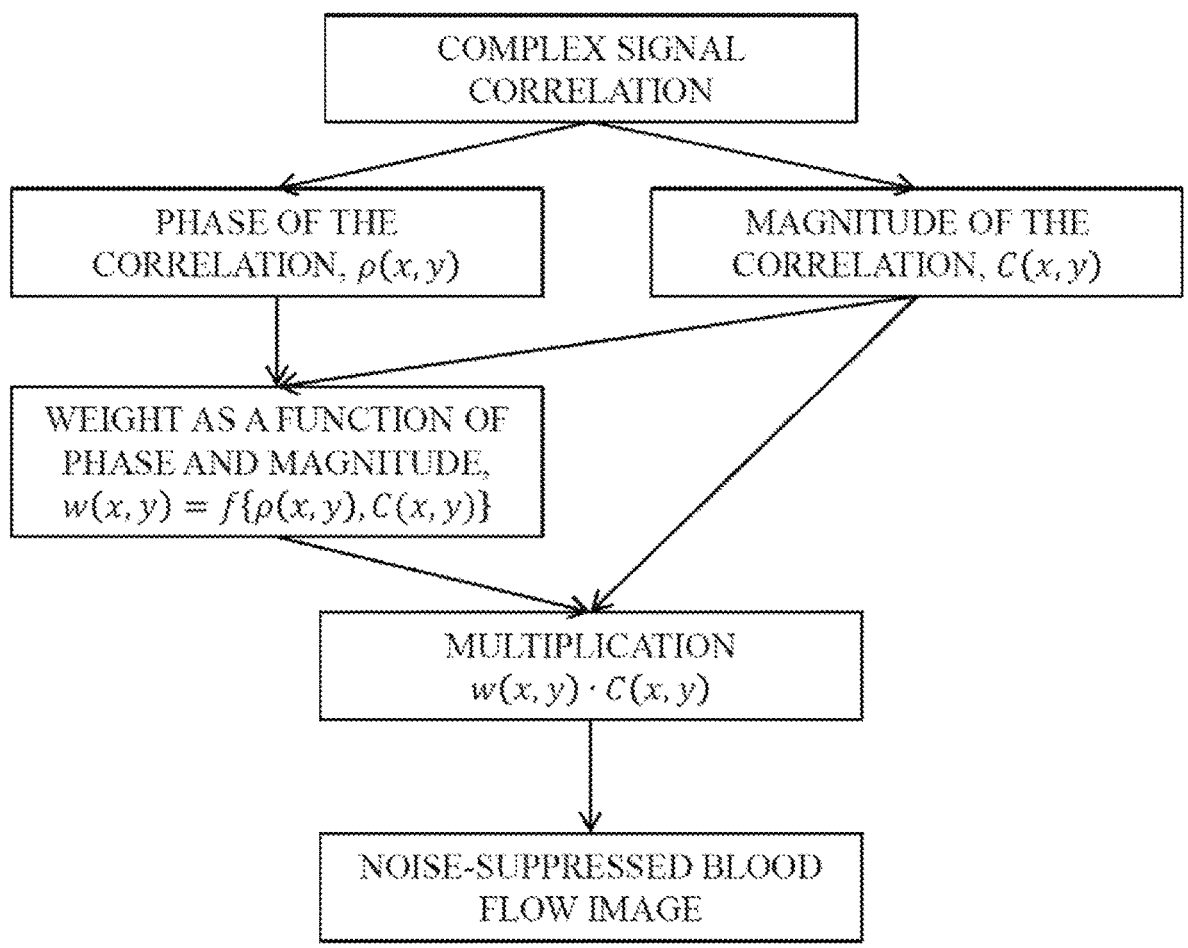
FIG. 11 is a flowchart setting forth the general steps of an example method for reducing residual noise based on a correlation phase thresholding and correlation magnitude.

A flowchart setting forth the general steps of an example method for reducing residual noise based on a correlation phase thresholding and correlation magnitude is shown in FIG. 11.

In one simple example, the weight can be designed as, $$w(x, y) = \begin{cases} 1 & \rho(x, y) \in [-\rho_{th}, \rho_{th}] \text{ or } C(x, y) \geq C_{th} \\ 0 & \text{otherwise} \end{cases}; \quad (34)$$

where $C_{th}$ is the magnitude threshold. Eqn. (34) indicates that those image pixels with small correlation phase (i.e., $\rho(x,y) \in [-\rho_{th}, \rho_{th}]$) or large magnitude (i.e., $C(x,y) \geq C_{th}$), are considered as blood signals and thus are preserved. Both the phase threshold $\rho_{th}$ and magnitude threshold $C_{th}$ can be manually modified to achieve an optimal blood flow image quality according to the specific target tissue.

Due to the time gain compensation ("TGC") and beamforming settings, the noise level is often spatially varying. Therefore, in one example, the magnitude threshold $C_{th}$ is not necessarily constant over the whole image; rather, the magnitude threshold $C_{th}$ can be set as a spatially dependent value according to the noise level. In another example, the noise profile can be used to adjust the microvessel image before generating the weight w(x,y). That is, in some implementations, the weight w(x,y) can be a function of phase and magnitude of the correlation and the noise profile, as, $$w(x,y)=f\{\rho(x,y),C(x,y),N(x,y)\} \quad (35);$$

where N(x,y) is the noise profile of the ultrasound image, which can be obtained by various methods. For instance, the noise profile can be obtained using the methods described in co-pending U.S. Patent Application Publication No. US 2019/0053780, which is herein incorporated by reference in its entirety. As a simple example, applying noise equalization, such as described in co-pending U.S. Patent Application Publication No. US 2019/0053780 before generating the weights w(x,y) simplifies Eqn. (35) as, $$w(x,y)=f\{\rho(x,y),C(x,y)/N(x,y)\} \quad (36).$$

Furthermore, in addition to using the magnitude of the correlation, the original power Doppler image can also be applied to produce the weight in Eqn. (35), as, $$w(x,y)=f\{\rho(x,y),PD(x,y),N(x,y)\} \quad (37)$$

where PD(x,y) indicates the original power Doppler of the blood flow image. The original power Doppler image can also be used by applying a weighting to it. In this case, the final blood flow image can be expressed as, $$UMI(x,y)=w(x,y) \cdot PD(x,y) \quad (38).$$

Figure 12:
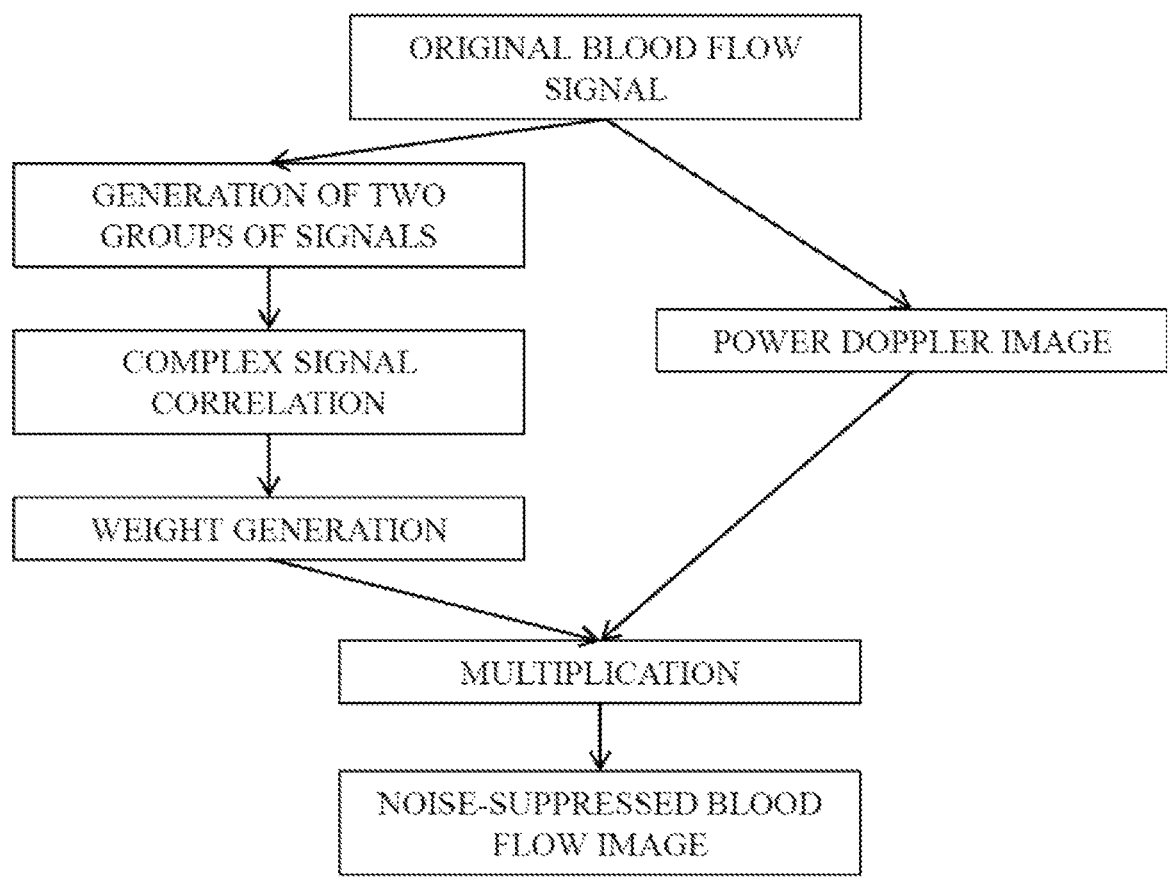
FIG. 12 is a flowchart setting forth the general steps of an example method for reducing residual noise based on weighting (e.g., using correlation phase thresholding, magnitude thresholding, or both) of a power Doppler image.

A flowchart setting forth the general steps of an example method for reducing residual noise based on weighting (e.g., using correlation phase thresholding, magnitude thresholding, or both) of a power Doppler image is shown in FIG. 12.

Image filters, such as median filter, mean filter, or any other smooth or low pass filters, can also be applied to remove the residual noise in the final blood flow image obtained by any of the above methods to further improve the image quality.

The correlation images with different time shifts T can be combined together to generated a final microvessel image. In one example, the two correlating signals can be derived as described above and the final microvessel image can be expressed as, $$UMI(x, y) = \sum_{\tau} \text{Corr}(x, y, \tau) \text{ for } \tau \text{ being any integer,} \quad (39)$$

such as 0, ±1, ±2, ....

Before performing the summation, the microvessel image for each time shift τ can be the complex correlation map, the magnitude of the normalized correlation map, the real part of the normalized correlation, the noise-suppressed image obtained with the above proposed approaches, and so on.

The methods described above have been described with respect to a two-dimensional imaging context, but can also be applied to three-dimensional, or even higher dimensional, ultrasound blood flow imaging. Similarly, although the methods have been described with respect to non-contrast blood flow imaging, they can also be implemented in contrast-enhanced ultrasound imaging with microbubbles for better noise suppression.

Additionally or alternatively to reducing residual noise in blood flow images, it is an aspect of the present disclosure to enhance slow flow signals in blood flow images. As noted above, slow flow signals can be enhanced based, at least in part, on the normalized correlation of groups of blood flow signals after tissue clutter filtering. The groups (e.g., two groups) of blood flow signals can be selected or otherwise formed as described above. An advantage of using the normalized correlation to produce blood flow images is two-fold: the background noise is suppressed and the slow and weak blood flow in small vessels can be significantly enhanced. For two groups of filtered blood flow signals such as those described above, the normalized correlation can be expressed as, $$N\_\text{Corr}(x, y) = \frac{\sum_{i=1}^{N} S_1(x, y, i) S_2^*(x, y, i)}{\sqrt{\sum_{i=1}^{N} |S_1(x, y, i)|^2} \sqrt{\sum_{i=1}^{N} |S_2(x, y, i)|^2}}; \quad (40)$$

which can be used as the microvessel image. Using this technique, background noise can be significantly suppressed due to the uncorrelated nature of the random noise. Because the fast flow moves faster and thus the ultrasound echo from the fast flow decorrelates faster, the slow flow in small vessels is inherently more coherent than the fast flow in the temporal direction. Therefore, the normalized correlation coefficient of the slow flow will generally be larger because the slow flow signal is more "similar," which leads to the enhancement of the small vessel in the blood flow image.

The normalized correlation calculation can be applied to any suitable data form, such as RF data and IQ data. For IQ data, the normalized correlation is typically a complex number, and thus, in one example, the magnitude of the normalized correlation can be used as the final blood flow image. In another example, the real part of the normalized correlation can be used by removing all the negative values. In still another example, the methods described above for removing residual noise can be applied, and thus the final ultrasound microvessel image can be obtained as:

$$UMI(x,y)=w(x,y) \cdot |N\_Corr(x,y)| \quad (41);$$

where $w(x,y)$ is the weight applied to the blood flow image, which in general can be a function of the correlation phase or both the correlation phase and magnitude, as described above.

Similar to the methods for removing residual noise, the methods for enhancing slow flow signals can also be extended to calculate the normalized correlation between signals with a certain temporal shift, $$N\_Corr(x, y, \tau) = \frac{\sum_{i=1}^{N-\tau} S_1(x, y, i) S_2^*(x, y, i+\tau)}{\sqrt{\sum_{i=1}^{N} |S_1(x, y, i)|^2} \sqrt{\sum_{i=1}^{N} |S_2(x, y, i)|^2}}; \quad (42)$$

where $\tau$ is an integer indicating the number of frame shift between the two groups of signals. Taking the limit number of frames into account, Eqn. (42) can be further modified as, $$N\_Corr(x, y, \tau) = \frac{N}{N-\tau} \frac{\sum_{i=1}^{N-\tau} S_1(x, y, i) S_2^*(x, y, i+\tau)}{\sqrt{\sum_{i=1}^{N} |S_1(x, y, i)|^2} \sqrt{\sum_{i=1}^{N} |S_2(x, y, i)|^2}}; \quad (43)$$

where a scale factor of $N/N-\tau$ is included, and T can be any integer. In one example, $S_1(x,y,i)$ and $S_2(x,y,i)$ can be obtained as described above, such as by using Eqns. (19) and (20). In the latter instance, the normalized autocorrelation of the original blood flow signal in temporal direction is computed, as, $$N\_Corr(x, y, \tau) = \frac{N}{N-\tau} \frac{\sum_{i=1}^{N-\tau} S(x, y, i) S^*(x, y, i+\tau)}{\sum_{i=1}^{N} |S(x, y, i)|^2}. \quad (44)$$

Figure 13:
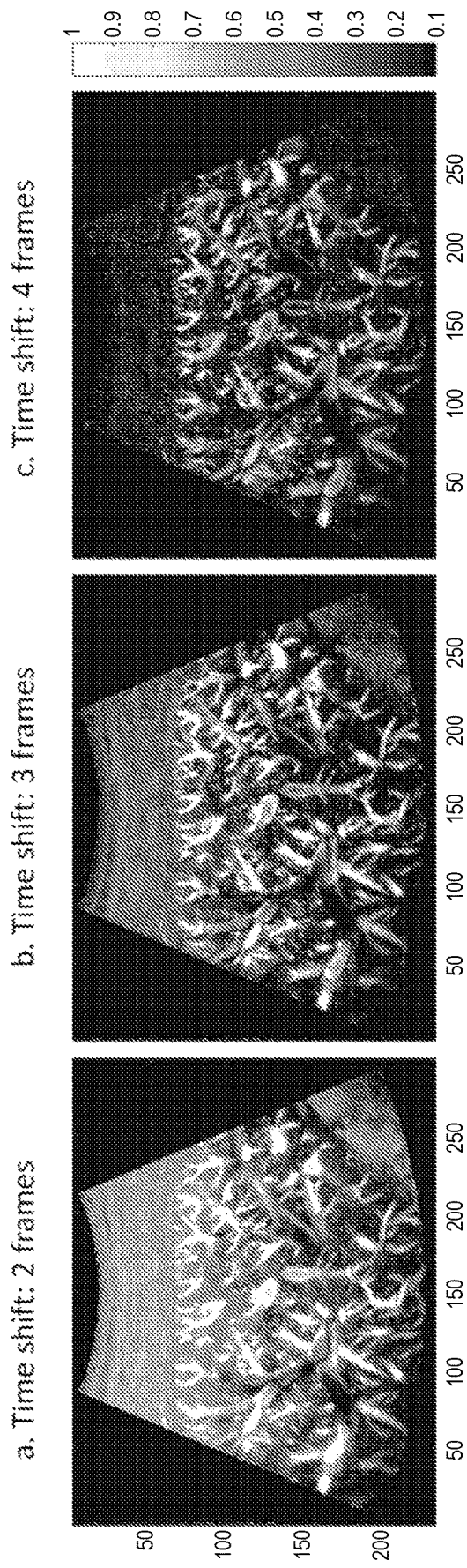
FIG. 13 shows examples of blood flow images produced using different time frame shifts in accordance with some embodiments described in the present disclosure.

An example of blood flow images with different time shifts is shown in FIG. 13, where the magnitude of the normalized correlation is used as the final image. The fast flow de-correlates further with the increase of the time shifts, while the slow flow de-correlates slower. However, the fast flow can de-correlate as fast as the noise and in this case a higher frame rate would be beneficial for better separation of the background noise and fast flow signals.

Figure 14:
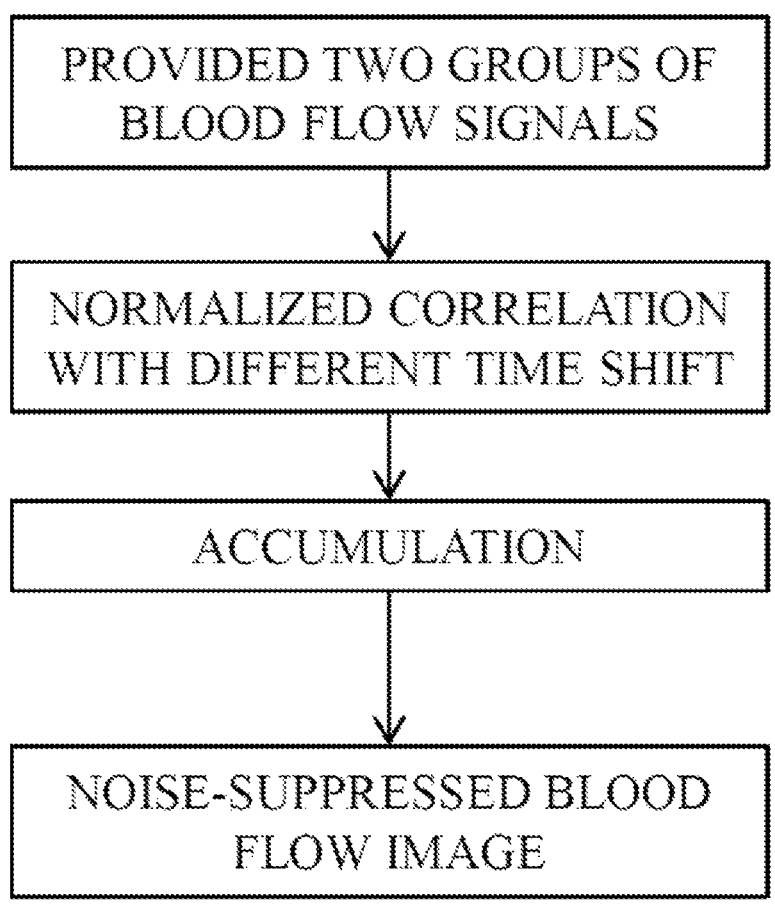
FIG. 14 a flowchart setting forth the general steps of an example method for enhancing slow flow signals based on a normalized correlation with different time shifts.

The normalized correlation with different time shifts can be combined together to generated a cumulated normalized correlation image, as expressed as, $$UMI(x, y) = \sum_{\tau} N\_Corr(x, y, \tau) \text{ for } \tau \text{ being any integer}, \quad (45)$$

such as $0, \pm 1, \pm 2, \ldots$;

which may further improve the noise suppression and enhance the small vessel visualization. Before the summation, in one example, the blood flow image for each time shift $\tau$ can be complex normalized correlation; in another example, blood flow image for each time shift $\tau$ can be the magnitude of the normalized correlation, or the real part of the normalized correlation. In still another example, the blood flow image for each time shift $\tau$ before summation can be the noise suppressed image obtained with the methods described above for removing residual noise. An example of a flowchart setting forth the general steps for such implementations is shown in FIG. 14.

The normalized correlation is independent to the TGC settings and beamforming processing settings because it indicates the de-correlation rate of the signals (i.e., the temporal coherence of the signals). Because the fast flow signal de-correlates faster than that of the slow flow, the normalized correlation image can provide, even indirectly, the microvessel velocity information of the small vessels, which may be beneficial for quantitative blood perfusion estimations. It is noted that although the fast flow corresponds to lower values in the correlation map, the correlation values can be reversed by computing 1−Corr(x,y) or 1−N_Corr(x,y) (i.e., a 1-correlation map) to show blood flow velocity distribution, in which the slow flow has smaller value and fast flow has a larger value. In addition to showing the qualitative velocity information, the normalized correlation based microvessel imaging may also be superior in vessel density quantification compared with conventional power Doppler images because the normalized correlation is depth-independent for the TGC and beamforming settings. A weighted average of normalized correlation over a local window can also be performed to improve SNR.

Again, the methods described above have been described with respect to a two-dimensional imaging context, but can also be applied to three-dimensional, or even higher dimensional, ultrasound blood flow imaging. Similarly, although the methods have been described with respect to non-contrast blood flow imaging, they can also be implemented in contrast-enhanced ultrasound imaging with microbubbles for better noise suppression. The methods described in the present disclosure can also be applied to blood flow signals obtained using any kind of clutter filters, including but not limited to SVD-based clutter filters. For SVD-based clutter filtering, the methods described in the present disclosure can be applied to a block-wise local SVD filtering technique, where the presented noise suppression method can be performed individually for each subset of data.

Figure 15:
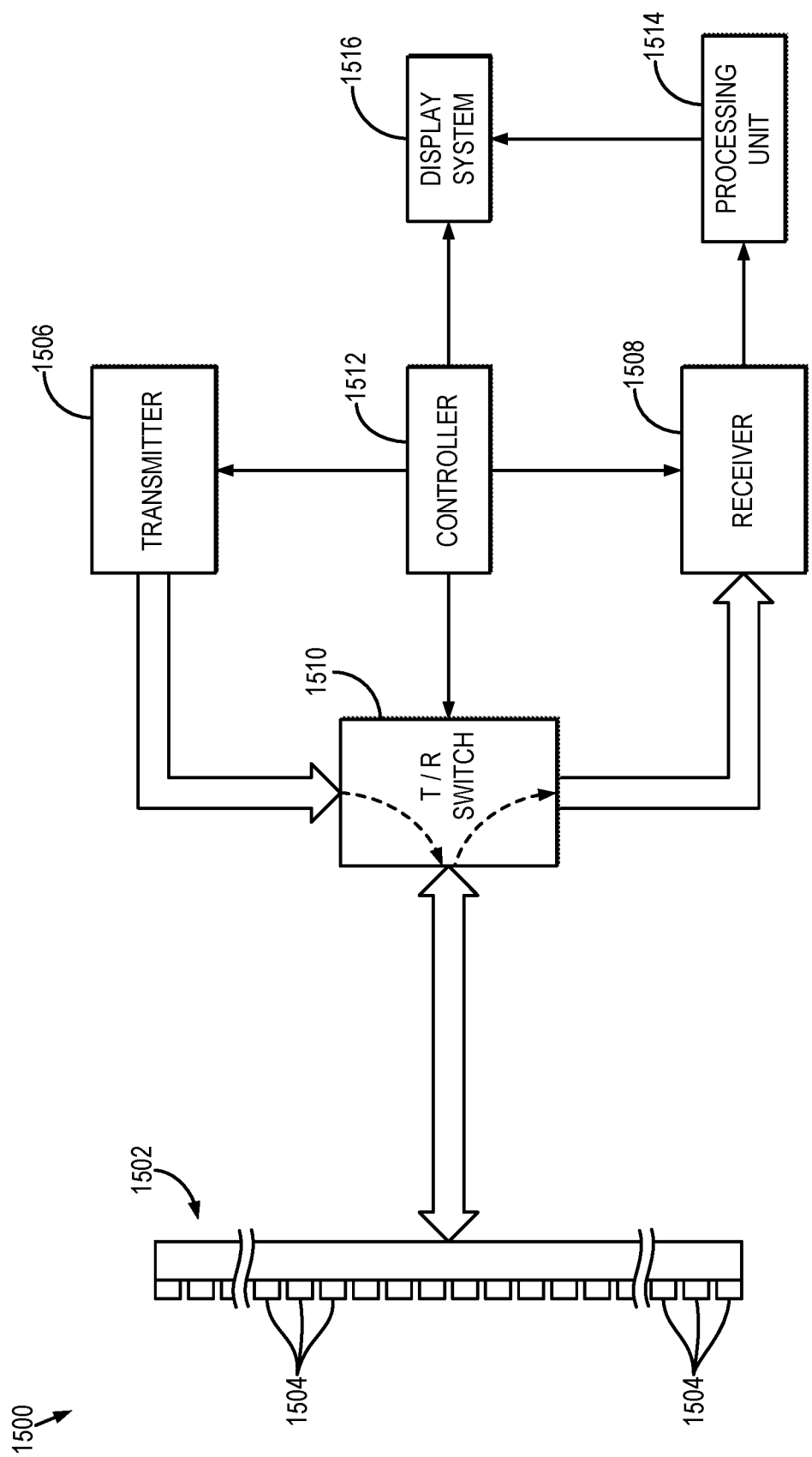
FIG. 15 is a block diagram of an example ultrasound system that can implement the methods described in the present disclosure.

FIG. 15 illustrates an example of an ultrasound system 1500 that can implement the methods described in the present disclosure. The ultrasound system 1500 includes a transducer array 1502 that includes a plurality of separately driven transducer elements 1504. The transducer array 1502 can include any suitable ultrasound transducer array, including linear arrays, curved arrays, phased arrays, and so on. Similarly, the transducer array 1502 can include a 1D transducer, a 1.5D transducer, a 1.75D transducer, a 2D transducer, a 3D transducer, and so on.

When energized by a transmitter 1506, a given transducer element 1504 produces a burst of ultrasonic energy. The ultrasonic energy reflected back to the transducer array 1502 (e.g., an echo) from the object or subject under study is converted to an electrical signal (e.g., an echo signal) by each transducer element 1504 and can be applied separately to a receiver 1508 through a set of switches 1510. The transmitter 1506, receiver 1508, and switches 1510 are operated under the control of a controller 1512, which may include one or more processors. As one example, the controller 1512 can include a computer system.

The transmitter 1506 can be programmed to transmit unfocused or focused ultrasound waves. In some configurations, the transmitter 1506 can also be programmed to transmit diverged waves, spherical waves, cylindrical waves, plane waves, or combinations thereof. Furthermore, the transmitter 1506 can be programmed to transmit spatially or temporally encoded pulses.

The receiver 1508 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 1506 and the receiver 1508 can be programmed to implement a high frame rate. For instance, a frame rate associated with an acquisition pulse repetition frequency ("PRF") of at least 100 Hz can be implemented. In some configurations, the ultrasound system 1500 can sample and store at least one hundred ensembles of echo signals in the temporal direction.

The controller 1512 can be programmed to implement the imaging sequences described in the present disclosure, or as otherwise known in the art. In some embodiments, the controller 1512 receives user inputs defining various factors used in the design of the imaging sequence.

A scan can be performed by setting the switches 1510 to their transmit position, thereby directing the transmitter 1506 to be turned on momentarily to energize transducer elements 1504 during a single transmission event according to the selected imaging sequence. The switches 1510 can then be set to their receive position and the subsequent echo signals produced by the transducer elements 1504 in response to one or more detected echoes are measured and applied to the receiver 1508. The separate echo signals from the transducer elements 1504 can be combined in the receiver 1508 to produce a single echo signal.

The echo signals are communicated to a processing unit 1514, which may be implemented by a hardware processor and memory, to process echo signals or images generated from echo signals. As an example, the processing unit 1514 can reconstruct blood flow images with removed or otherwise reduced noise-induced bias using the methods described in the present disclosure. Images produced from the echo signals by the processing unit 1514 can be displayed on a display system 1516.

Figure 16:
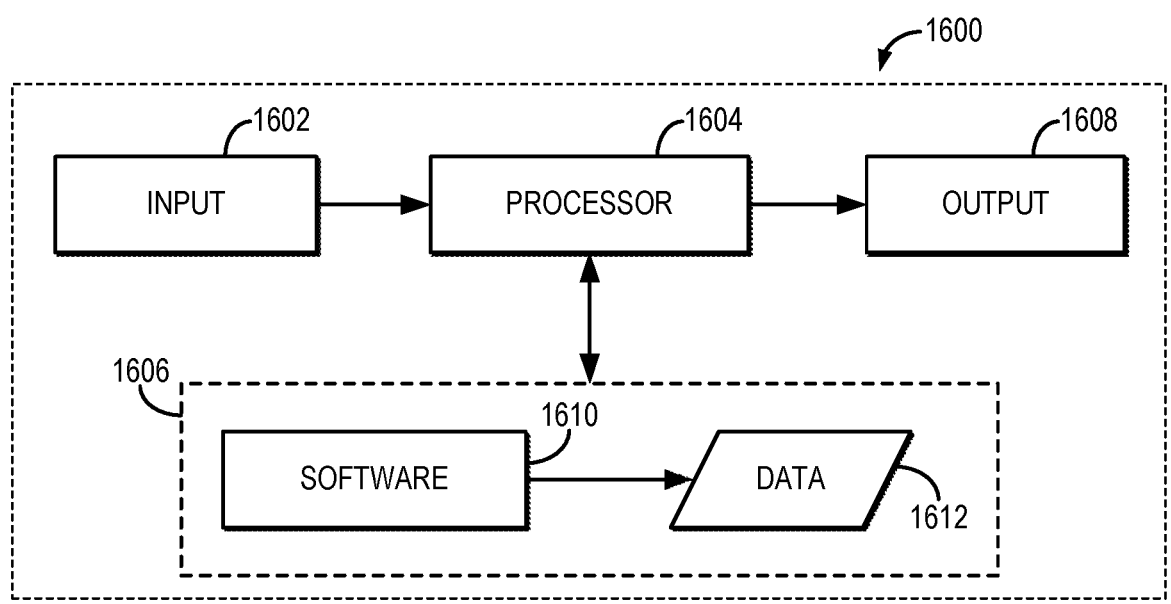
FIG. 16 is a block diagram of an example computer system that can implement the methods described in the present disclosure.

Referring now to FIG. 16, a block diagram of an example of a computer system 1600 that can perform the methods described in the present disclosure is shown. The computer system 1600 generally includes an input 1602, at least one hardware processor 1604, a memory 1606, and an output 1608. Thus, the computer system 1600 is generally implemented with a hardware processor 1604 and a memory 1606.

In some embodiments, the computer system 1600 can be a part of an ultrasound system, such as the ultrasound system described above. The computer system 1600 may also be implemented, in some examples, by a workstation, a notebook computer, a tablet device, a mobile device, a multimedia device, a network server, a mainframe, one or more controllers, one or more microcontrollers, or any other general-purpose or application-specific computing device.

The computer system 1600 may operate autonomously or semi-autonomously, or may read executable software instructions from the memory 1606 or a computer-readable medium (e.g., a hard drive, a CD-ROM, flash memory), or may receive instructions via the input 1602 from a user, or any another source logically connected to a computer or device, such as another networked computer or server. Thus, in some embodiments, the computer system 1600 can also include any suitable device for reading computer-readable storage media.

In general, the computer system 1600 is programmed or otherwise configured to implement the methods and algorithms described in the present disclosure. For instance, the computer system 1600 can be programmed to reconstruct blood flow images in which noise-induced bias has been removed or otherwise reduced.

The input 1602 may take any suitable shape or form, as desired, for operation of the computer system 1600, including the ability for selecting, entering, or otherwise specifying parameters consistent with performing tasks, processing data, or operating the computer system 1600. In some aspects, the input 1602 may be configured to receive data, such as data acquired with an ultrasound system. Such data may be processed as described above to reconstruct blood flow images in which noise-induced bias has been removed or otherwise reduced. In addition, the input 1602 may also be configured to receive any other data or information considered useful for reconstructing blood flow images in which noise-induced bias has been removed or otherwise reduced using the methods described above.

Among the processing tasks for operating the computer system 1600, the one or more hardware processors 1604 may also be configured to carry out any number of post-processing steps on data received by way of the input 1602.

The memory 1606 may contain software 1610 and data 1612, such as data acquired with an ultrasound system, and may be configured for storage and retrieval of processed information, instructions, and data to be processed by the one or more hardware processors 1604. In some aspects, the software 1610 may contain instructions directed to reconstructing blood flow images in which noise-induced bias has been removed or otherwise reduced.

In addition, the output 1608 may take any shape or form, as desired, and may be configured for displaying blood flow images, in addition to other desired information.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (e.g., hard disks, floppy disks), optical media (e.g., compact discs, digital video discs, Blu-ray discs), semiconductor media (e.g., random access memory ("RAM"), flash memory, electrically programmable read only memory ("EPROM"), electrically erasable programmable read only memory ("EEPROM")), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

The present disclosure has described one or more preferred embodiments, and it should be appreciated that many equivalents, alternatives, variations, and modifications, aside from those expressly stated, are possible and within the scope of the invention.

The invention claimed is:

1. A method for removing a noise-induced bias from ultrasound data in order to reconstruct an image depicting blood flow in which the noise-induced bias is removed, the steps of the method comprising:
   (a) accessing with a computer system, ultrasound frame data comprising frames of ultrasound data acquired with different transmitting angles;
   (b) forming with the computer system:
      a first group of ultrasound frame data by selecting a first number of the frames of ultrasound data corresponding to a first plurality of transmitting angles selected from the different transmitting angles for the first group;
      a second group of ultrasound frame data by selecting a second number of the frames of ultrasound data corresponding to a second plurality of transmitting angles selected from the different transmitting angles for the second group;
   (c) reconstructing with the computer system:
      a first compounded image by compounding the frames of ultrasound data in the first group;
      a second compounded image by compounding the frames of ultrasound data in the second group;
   (d) producing with the computer system:
      first blood flow signal data by clutter filtering the first compounded image;
      second blood flow signal data by clutter filtering the second compounded image;
   (e) reconstructing a blood flow image with the computer system by computing a correlation between the first blood flow signal data and the second blood flow signal data, the blood flow image depicting blood flow in which noise-induced bias has been removed.

2. The method as recited in claim 1, wherein the first group and the second group comprise non-overlapping groups of the frames of ultrasound data.

3. The method as recited in claim 1, wherein the first number of the frames of ultrasound data is different from the second number of the frames of ultrasound data.

4. The method as recited in claim 1, wherein the first group comprises the frames of ultrasound data acquired with angle numbers 1 to N/2, and the second group comprises the frames of ultrasound data acquired with angle numbers (N/2)+1 to N, wherein N is a total number of the different transmitting angles.

5. The method as recited in claim 1, wherein computing the correlation in step (e) comprises computing the correlation between the first blood flow signal data and the second blood flow signal data along a slow time dimension.

6. The method as recited in claim 5, wherein the correlation is computed as an inner product of the first blood flow signal data and the second blood flow signal data along the slow time dimension.

7. The method as recited in claim 1, wherein the ultrasound frame data are acquired using an ultrasound system with imaging settings selected to modify a first point spread function (PSF) associated with the first group and a second PSF associated with the second group such that incoherent artifacts are reduced in the blood flow image reconstructed in step (e).

8. The method as recited in claim 1, wherein the clutter filtering in step (d) comprises at least one of high-pass temporal filtering, regression-based filtering, eigen-based clutter filtering, singular value decomposition (SVD) based filtering, or spatial-temporal filtering.

9. The method as recited in claim 8, wherein the clutter filtering in step (d) comprises SVD-based filtering and wherein step (d) comprises dividing the first compounded image into a first plurality of image blocks and producing the first blood flow signal data by clutter filtering each of the first plurality of image blocks using the SVD-based filtering; and dividing the second compounded image into a second plurality of image blocks and producing the second blood flow signal data by clutter filtering each of the second plurality of image blocks using the SVD-based filtering.

10. The method as recited in claim 1, wherein the frames of ultrasound data in the second group have a time delay relative to the frames of ultrasound data in the first group.

11. The method as recited in claim 1, wherein the correlation between the first blood flow signal data and the second blood flow signal data is a normalized correlation.

12. The method as recited in claim 1, wherein step (e) further includes suppressing residual noise in the blood flow image by thresholding the blood flow image based on a phase of the correlation.

13. The method as recited in claim 12, wherein reconstructing the blood flow image comprises weighting one of a magnitude of the correlation or a real part of the correlation using a weight function that is a function of the phase of the correlation.

14. The method as recited in claim 12, wherein step (e) further includes suppressing residual noise in the blood flow image by thresholding the blood flow image based on both the phase of the correlation and a magnitude of the correlation.

15. The method as recited in claim 14, wherein reconstructing the blood flow image comprises weighting a magnitude of the correlation using a weight function that is a function of the phase of the correlation and the magnitude of the correlation.

16. A method for removing a noise-induced bias from ultrasound data in order to reconstruct an image depicting blood flow in which the noise-induced bias is removed, the steps of the method comprising:
   (a) accessing with a computer system, ultrasound data acquired with an ultrasound system;
   (b) forming with the computer system:
      a first group of ultrasound frame data by selecting a first number of frames of the ultrasound data for the first group;
      a second group of ultrasound frame data by selecting a second number of frames of the ultrasound data for the second group;
      wherein the first group of ultrasound frame data comprise frames of the ultrasound data that are temporally adjacent to frames of the ultrasound data in the second group of ultrasound frame data;
   (c) reconstructing with the computer system:
      a first image from the ultrasound data in the first group;
      a second image from the ultrasound data in the second group;
   (d) producing with the computer system:
      first blood flow signal data by clutter filtering the first image;

second blood flow signal data by clutter filtering the second image;

(e) reconstructing a blood flow image with the computer system by computing a correlation between the first blood flow signal data and the second blood flow signal data, the blood flow image depicting blood flow in which noise-induced bias has been removed based on temporal coherence of blood flow signals in the first and second blood flow signal data and lack of correlation of noise signals in the first and second blood flow signal data.

17. The method as recited in claim 16, wherein, the first number of ultrasound frames is equal to the second number of ultrasound frames.

18. The method as recited in claim 17, wherein the ultrasound data comprises frames of ultrasound data that are acquired in pairs, and wherein the first group comprises each first frame of ultrasound data in each pair and the second group comprises each second frame of ultrasound data in each pair.

19. The method as recited in claim 18, wherein each pair of ultrasound data frames is acquired at an ensemble pulse repetition frequency (ePRF) and the frames of ultrasound data within each pair are acquired at a correlation pulse repetition frequency (cPRF) that is higher than the ePRF.

20. The method as recited in claim 19, wherein the cPRF is selected to minimize decorrelation of blood signal between frames of ultrasound data within each pair.

21. The method as recited in claim 17, wherein the ultrasound data comprises N frames of ultrasound data and the first group comprises N−t frames ranging from frame 1 to frame N−t, and the second group comprises N−t frames ranging from frame 1+t to frame N, wherein t is a number of delay frames.

22. The method as recited in claim 21, wherein the correlation between the first blood flow signal data and the second blood flow signal data is a normalized correlation.

23. The method as recited in claim 16, wherein computing the correlation in step (e) comprises computing the correlation between the first blood flow signal data and the second blood flow signal data along a slow time dimension.

24. The method as recited in claim 23, wherein the correlation is computed as an inner product of the first blood flow signal data and the second blood flow signal data along the slow time dimension.

25. The method as recited in claim 16, wherein the correlation between the first blood flow signal data and the second blood flow signal data is a normalized correlation.

26. The method as recited in claim 16, wherein step (e) further includes suppressing residual noise in the blood flow image by thresholding the blood flow image based on a phase of the correlation.

27. The method as recited in claim 26, wherein reconstructing the blood flow image comprises weighting one of a magnitude of the correlation or a real part of the correlation using a weight function that is a function of the phase of the correlation.

28. The method as recited in claim 26, wherein step (e) further includes suppressing residual noise in the blood flow image by thresholding the blood flow image based on both the phase of the correlation and a magnitude of the correlation.

29. The method as recited in claim 28, wherein reconstructing the blood flow image comprises weighting the magnitude of the correlation using a weight function that is a function of the phase of the correlation and the magnitude of the correlation.

30. The method as recited in claim 16, wherein the ultrasound data are acquired using an ultrafast synthetic transmit aperture technique, and wherein the ultrasound data in the first group and in the second group correspond to ultrasound signals acquired with different sub-apertures.

* * * * *

UNITED STATES PATENT AND TRADEMARK OFFICE
CERTIFICATE OF CORRECTION

PATENT NO. : 12,478,352 B2  
APPLICATION NO. : 17/260793  
DATED : November 25, 2025  
INVENTOR(S) : Joshua D. Trzasko et al.

Page 1 of 1

It is certified that error appears in the above-identified patent and that said Letters Patent is hereby corrected as shown below:

In the Specification

Column 13, Eq. (20), "=S(x,y,i+T)" should be --=S(x,y,i+τ)--.

Column 14, Line 38, ")$e^{j\omega/\Delta t}$" should be --)$e^{-j\omega(x,y)i\Delta t}$--.

Signed and Sealed this  
Tenth Day of February, 2026

John A. Squires  
*Director of the United States Patent and Trademark Office*